(12) United States Patent
Smith et al.

(10) Patent No.: US 12,715,798 B2
(45) **Date of Patent: *Aug. 25, 2026**

(54) MULTIPLE CHAMBER SEPTIC TANK WITH A PLURALITY OF LARGE AND SMALL ACCESS PORTS

(71) Applicant: KleanTu LLC, Bridgeville, PA (US)

(72) Inventors: John R. Smith, Pittsburgh, PA (US); Ron Keffer, Harrison City, PA (US); Robert Horger, Harrison City, PA (US); Andrew C. Middleton, Mount Sidney, VA (US); Robin L. Weightman, Murrysville, PA (US); Peter Goodale, Vineyard Haven, MA (US); Richard Donahue, Edgartown, MA (US)

(73) Assignee: KleanTu LLC, Bridgeville, PA (US)

( * ) Notice: Subject to any disclaimer, the term of this patent is extended or adjusted under 35 U.S.C. 154(b) by 192 days.

This patent is subject to a terminal disclaimer.

(21) Appl. No.: 18/651,122

(22) Filed: Apr. 30, 2024

(65) Prior Publication Data

US 2024/0279095 A1 Aug. 22, 2024

Related U.S. Application Data

(63) Continuation of application No. 17/014,924, filed on Sep. 8, 2020, now Pat. No. 11,981,590, which is a continuation-in-part of application No. 16/042,863, filed on Jul. 23, 2018, now abandoned, and a continuation-in-part of application No. 15/835,343, filed on Dec. 7, 2017, now abandoned.

(60) Provisional application No. 62/535,919, filed on Jul. 23, 2017.

(51) Int. Cl.
*C02F 3/02* (2023.01)
*C02F 103/00* (2006.01)

(52) U.S. Cl.
CPC .......... *C02F 3/02* (2013.01); *C02F 2103/005* (2013.01); *C02F 2203/006* (2013.01)

(58) Field of Classification Search
CPC .... C02F 3/10; C02F 3/307; C02F 3/30; C02F 3/284; C02F 2101/16; C02F 2203/006; C02F 3/288; C02F 3/301; E03F 11/00
USPC .................................................... 210/170.08
See application file for complete search history.

(56) References Cited

U.S. PATENT DOCUMENTS

| | | | | |
|---|---|---|---|---|
| 5,207,899 | A | 5/1993 | Boyle | |
| 5,980,739 | A | 11/1999 | Jowett | |
| 2003/0024874 | A1 | 2/2003 | Wallace | |
| 2006/0254967 | A1* | 11/2006 | McKinney | C02F 3/1242 210/197 |
| 2008/0185335 | A1* | 8/2008 | Holt | C02F 3/288 210/603 |
| 2011/0079555 | A1 | 4/2011 | Wu | |

(Continued)

FOREIGN PATENT DOCUMENTS

WO WO-2014172791 A1 * 10/2014 ................ C02F 3/34

*Primary Examiner* — Claire A Norris
(74) *Attorney, Agent, or Firm* — Christopher B. Kilner; MILLEN, WHITE, ZELANO & BRANIGAN, P.C.

(57) ABSTRACT

A septic tank system includes a multiple compartmented (or chambered) supplemental tank. The supplemental tank has a cover/lid with a plurality of strategically situated access holes (both small and large ports) for servicing the various chambers from above ground.

17 Claims, 23 Drawing Sheets

(56) References Cited

U.S. PATENT DOCUMENTS

| | | | | |
|---|---|---|---|---|
| 2011/0186491 | A1* | 8/2011 | McKinney | C02F 3/02<br>210/151 |
| 2012/0211114 | A1 | 8/2012 | Nilsson | |
| 2014/0076800 | A1 | 3/2014 | Graves | |

* cited by examiner

G
50
SL
52

60
66
74
76
72
70
68
164
62

66
74
72
70
68
164
62

MULTIPLE CHAMBER SEPTIC TANK WITH A PLURALITY OF LARGE AND SMALL ACCESS PORTS

RELATED APPLICATIONS

This application is a continuation-in-part of co-pending U.S. application Ser. No. 16/042,863, filed on Jul. 23, 2018, which was a perfection of U.S. Provisional Application Ser. No. 62/535,919, filed on Jul. 23, 2017. It is also and a continuation-in-part of co-pending U.S. application Ser. No. 15/835,343, filed on Dec. 7, 2017. All prior disclosures are fully incorporated herein.

BACKGROUND OF THE INVENTION

Field of the Invention

This invention relates to the field of in ground septic tanks. More particularly, it relates to a series of improvements in septic tank systems for a single household or small business.

Relevant Art

U.S. Published Application No. 20030136789 shows a tank with a vertically extendable riser tube.

This application is patently distinct from the prior art, including the Nilsson patent cited against the parent filing in that the latter addresses installing liners IN LEAKING SEWERS using a push-pull technique. Specifically, Nilsson first places a liner then uses a bladder to squeeze that liner against the inner wall of a pipe before curing the liner with heat—a process routinely done by in situ sewer line contractors.

This invention, by sharp contrast, focuses on providing an underground supplemental concrete tank (not a leaky sewer pipe) that provides for aeration tubes, preferably flexible tubes, in respective protected rigid channels or trenches at the bottom of certain supplemental concrete tank sections/segments, said aeration tubes being adapted for periodic change outs: (1) from above ground; and (2) without having to remove that supplemental tank section's/segment's bed materials on top of the protected rigid channel or trench to gain access to such flexible aeration tubes. This is especially beneficial with the supplemental tank system of this invention wherein some of the tank sections/segments (or "aeration chambers") may be fully (or 100%) flooded at the time an aeration tube change out is warranted.

Another key point for further distinguishing over Nilsson's sewer line bladder installation is that the access holes in the tank top to Applicants' supplemental tank are in rigid connection with their tank top holes so as to allow the flexible air line tubes (or hoses) in given supplemental tank chambers to move freely about within said chamber's rigid channel or trench-thus enabling air line hose replacements IN Applicants' tank from the surface (i.e., above ground) through such tank top ports.

For the present invention (outlined below), it is important to clarify/differentiate between Applicants': (a) access ports, (b) their flexible air line tube (hose or tubing) for air delivery to achieve mixing and aeration of the wastewater and bacteria, and (c) their rigid channel, trench or "rigid pipe" enclosure to protect the flexible aeration hose (or air line tube/tubing that is encased within it for protection and change out of the flexible air line/aeration hose (tube or tubing).

Also noteworthy, Applicants' aeration hose/tube/tubing has two sections: (1) an impermeable plastic type hose/tube/tubing to deliver air from an air pump, most preferably above ground, to (2) a horizontal section of more permeable air hose/tube/tubing that is encased in a rigid channel, trench, pipe or structure. This rigid channel/trench or pipe has holes in it to let air from the more permeable flexible air hose/tube/tubing be transported up through a 100% flooded fixed, and submerged, media for mixing and aeration of the wastewater and the bacteria. The rigid protective channel, trench or pipe also has a lined system that allows the flexible aeration hose/tube/tubing (both impermeable and less permeable sections) to be changed out and a new flexible air line hose/tube/tubing added via a push-pull arrangement.

BRIEF SUMMARY OF THE INVENTION

The focus of this application is to provide an enhanced septic tank system, especially one having a multiple compartmented (segmented or chambered) supplemental tank with a tank cover/lid having a plurality of strategically situated access holes (with both small and large ports) in a purposefully staggered arrangement. Such ports would allow for performing at least one of: (i) adding one or more supplemental organics to one or more of said plurality of adjacent chambers; (ii) removing solid and/or liquid phase media from one or more of said plurality of adjacent chambers; (iii) adding bacterial seed sludge to enhance biochemical reactions; (iv) changing out aeration tubing and/or hoses from within one or more of said plurality of adjacent chambers; and/or (v) collecting samples from one or more of said plurality of adjacent chambers for operation, maintenance, troubleshooting and/or regulatory monitoring.

The invention is shown with a representative rectangular-shaped septic tank made from concrete. It is to be understood, however, that the concept of multiple chambers and both small and large access ports (to the ground surface) will also be applicable for rounded or oval septic tanks and/or for tanks made from various other materials including but not limited to plastic, wood, steel, aluminum and the like.

BRIEF SUMMARY OF THE DRAWINGS

Further features, objectives and advantages of these inventions will be more apparent when reviewing the following Detailed Description made with reference to the accompanying drawings in which:

FIG. 1I is a left front corner perspective of the FIG. 1H tank with green-colored tops positioned over the smaller access ports;

DESCRIPTION OF PREFERRED EMBODIMENTS

Figure 1A:
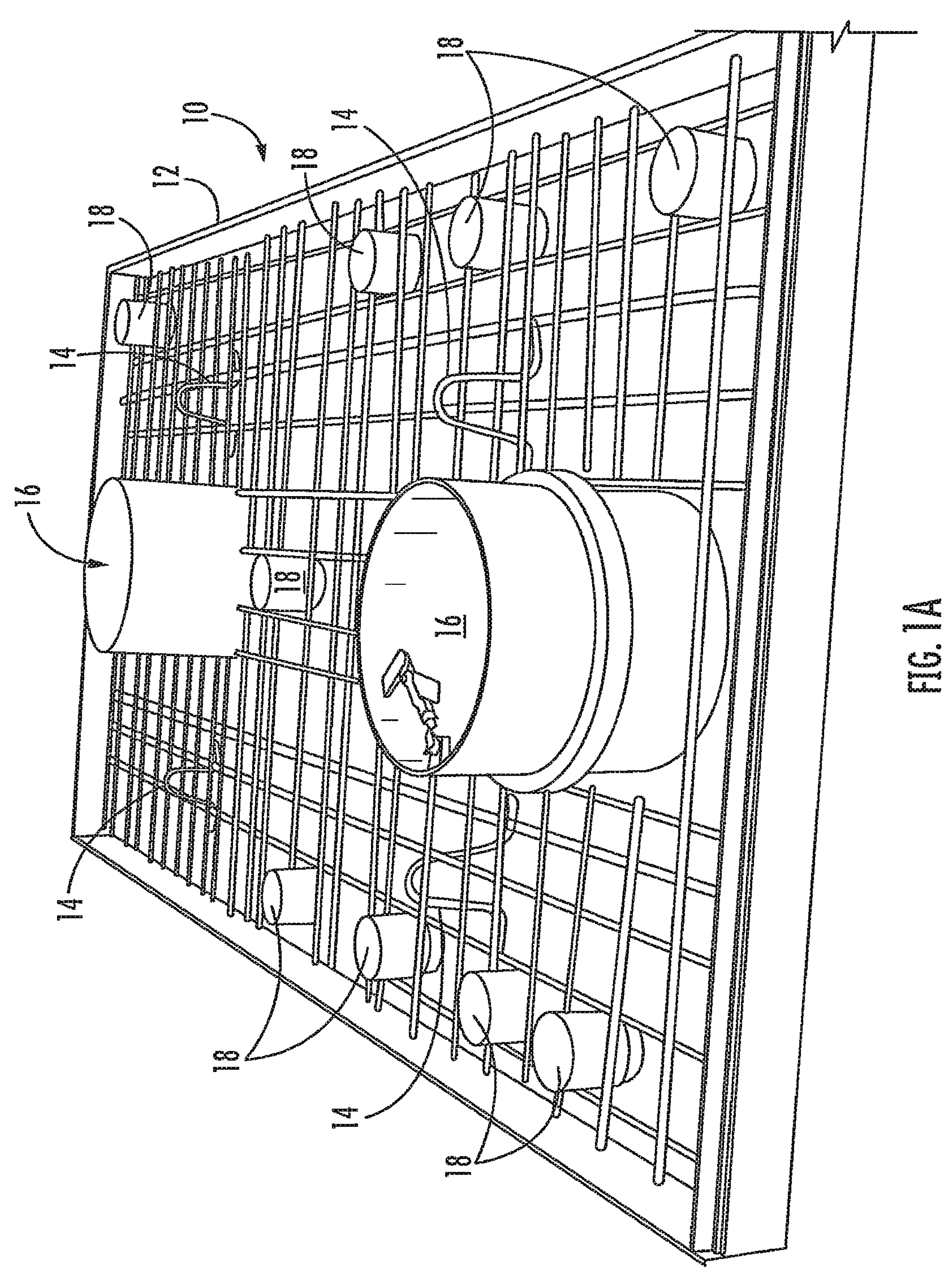
FIG. 1A is a front perspective view of a mold for forming a concrete top to a septic tank according to one preferred embodiment of this invention with its plurality of small and large access ports.

Common features in the different views of this invention are shown with the same reference numeral(s). For alternate embodiments of the same component, there is consistent numbering though in the next hundred series.

When referring to any numerical ranges herein, it should be noted that all numbers within the range, including every fraction or decimal between its stated minimum and maximum, are considered to be designated and disclosed by this description. As such, disclosing a preferred pipe diameter ranging from 3 to 7 inches, expressly covers pipe sizes of 3.1, 3.25 and 3.5 inches . . . and so on, up to about 6.75, 6.8 and 6.99 inches. The same applies for every other quantitative range herein.

A. General Layout and Materials of Construction

The NitROE® Tank receives wastewater that first goes through a settling chamber to remove settable and floating solids. This settling chamber can be a separate tank, such as a septic tank, or it can be connected to the adjacent wall of the NitROE® Tank. Note that all internal elements of the NitROE® tank are accessible from the surface. Thus maintenance can be performed without having to remove the tank top and the critical internal elements are accessible.

While the influent pipe is shown entering into the top left corner of the NitROE® Tank (see plan view), the influent pipe could also enter from the center or from the top left side of the tank with the ABR effluent piping then exiting out the top section with the ABR baffling being reversed along with flow thus allowing design flexibility.

Following gross solids separation from the wastewater, flow then goes into the following NitROE® Tank components:

1. An anaerobic baffled reactor (ABR) chamber
2. An aeration chamber
3. Trough A
4. Trough B
5. A de-nitrification chamber
6. Trough C Depending on the specific level of treatment required, not all of the different components may be needed. Additionally, the ABR Chamber could be done in a separate tank (i.e., an up-front septic tank) with the ABR treated effluent then going directly to the aeration Chamber. For example, if total nitrogen reduction is not required, but only reduction of organic and ammonia nitrogen along with suspended solids, then Trough B, the de-nitrification chamber, and Trough C may not be needed.

Through this sequential combination of process steps, the wastewater is treated for reduction of total suspended solids, insoluble and soluble organics measured as total organic carbon (TOC), chemical oxygen demand (COD), and biochemical oxygen demand ($BOD_5$). Reduction is also achieved for total nitrogen via the conversion of organic nitrogen first to ammonia, followed by the conversion of ammonia to nitrite and nitrate nitrogen, and finally the conversion of nitrite/nitrate nitrogen-to-nitrogen gas.

The NitROE® tank is designed such that all wastewater flow is done via gravity through the system via baffles and piping that serve to also direct the flow through the NitROE® tank to maximize treatment effectiveness. More specifically, flow through the ABR chamber is primarily vertical so that the wastewater is forced to pass through bacterial solids under anaerobic conditions. Wastewater flow through the remaining chambers of the NitROE® tank is primarily horizontal as controlled by specific location of flow distribution holes. However, as appropriate, flow through any one of these chambers could be designed to be horizontal or vertical.

The NitROE® Tank is also designed so that if for some unexpected reason wastewater flow is restricted or impaired, water will not back up into the influent sewer line but rather overflow the surface of the NitROE® tank to the final effluent line. This serves to negate the need for an external wastewater by-pass line located on the outside of the NitROE® tank.

Both the settling chamber and the NitROE® Tank outer structure can be constructed of concrete, brick and mortar or fabricated plastic. Within the NitROE® tank, all components are plastic including the different baffles and related structural components. As commercially available, focus is on utilizing as much recycled plastic components as possible. Even though plastic structural components are preferred, the design can also utilize other materials of construction as well.

Internal plastic baffle structures may be designed in such a manner so that media can be placed in a manner that it is supported and maintained in place. This specifically refers to the location of the black component in relation to the white sheet component.

When the NitROE® Tank is placed in the ground below grade, the design also incorporates the strategic location and size of access holes placed on the top of the NitROE® so that the top never has to be removed for servicing as all can be done via these access ports. Generally, tank top access ports are about 4-24 inches in size with the NitROE® tank having smaller and more multiple access ports as can be used for sampling, operational monitoring and operational servicing as needed.

B. Anaerobic Baffled Reactor (ABR) Chamber

The intent of the ABR Chamber is to provide for initial biodegradation under anaerobic conditions. While the ABR technology has been patented (McCarty 1992) and used in different configurations, the incorporation of this technology approach into the NitROE® tank is unique. Part of this comes from the use of structural components (plastic or wood) so that construction can be done on the scale of the NitROE® tank to handle small wastewater flows such as from an individual home or a small commercial operation such as a small store or restaurant. This incorporation serves to significantly reduce the level of influent organics prior to the aeration chamber without generating large amounts of bacterial solids as treatment is done under anaerobic conditions. The ABR chamber will also serve to remove and biodegrade bio-solids and breakdown organic nitrogen to ammonia for subsequent reduction in the aeration chamber.

Figure 7A:
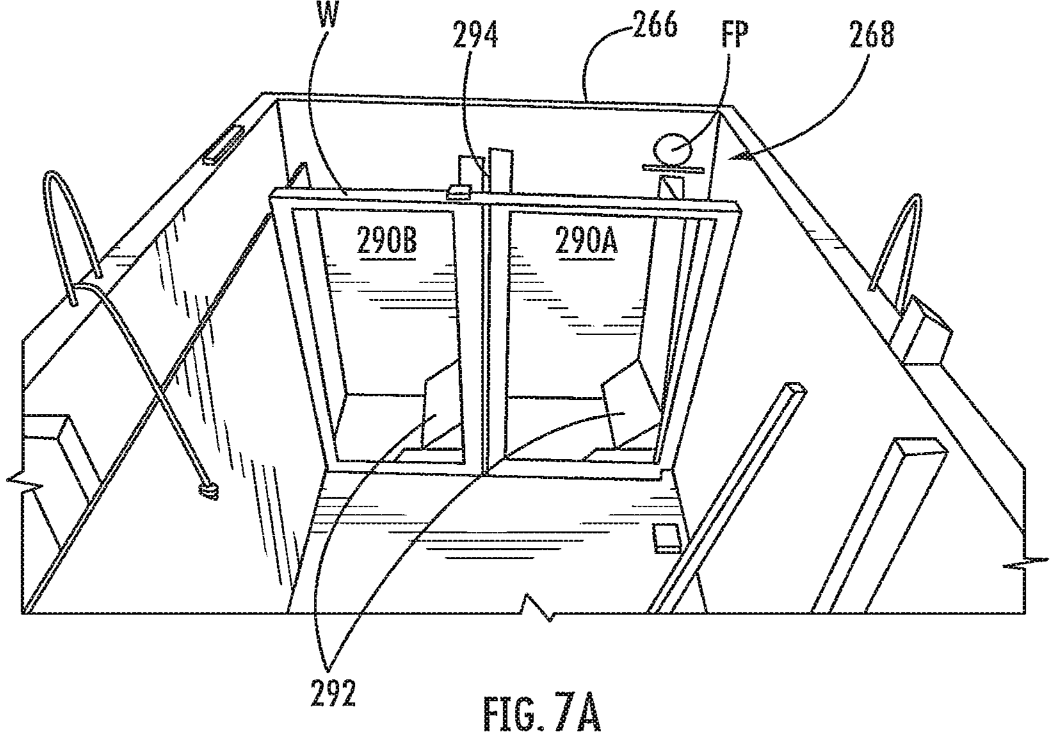
FIG. 7A is a rear perspective view showing one embodiment of ABR chamber as shown, mid-assembly, of the supplemental tank.
Figure 7B:
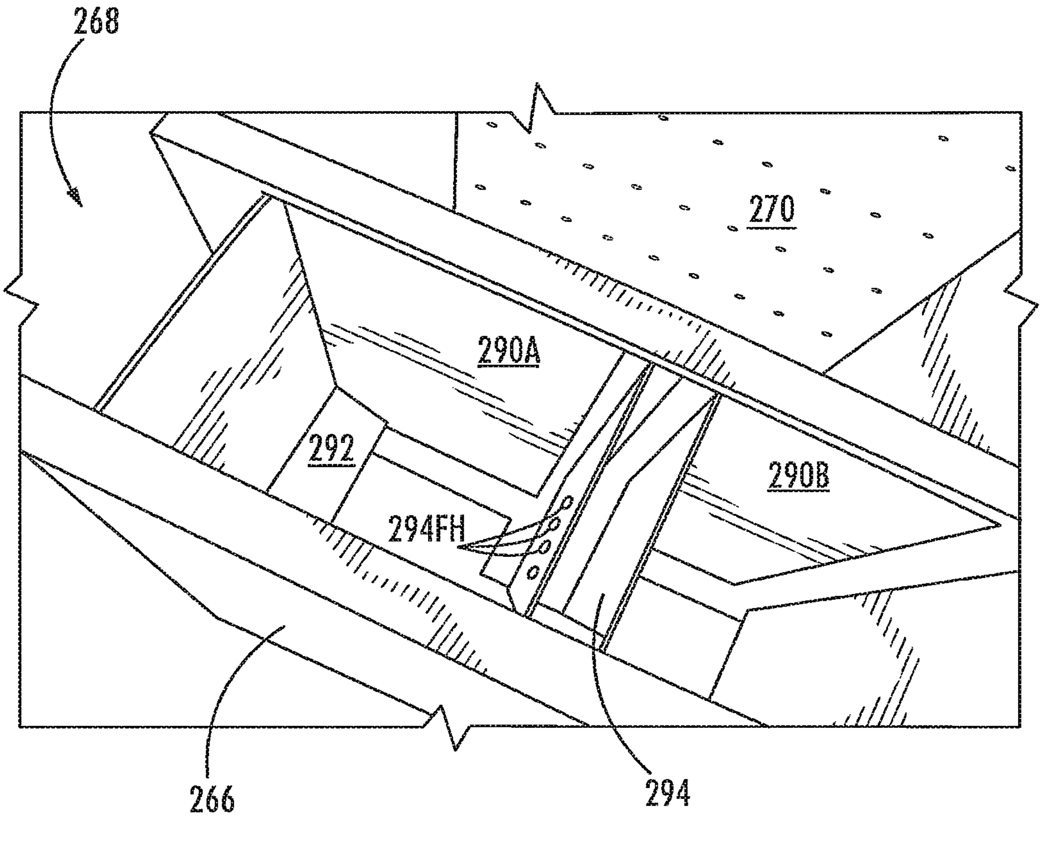
FIG. 7B is a top perspective view looking down into the ABR chamber from FIG. 7A.
Figure 7C:
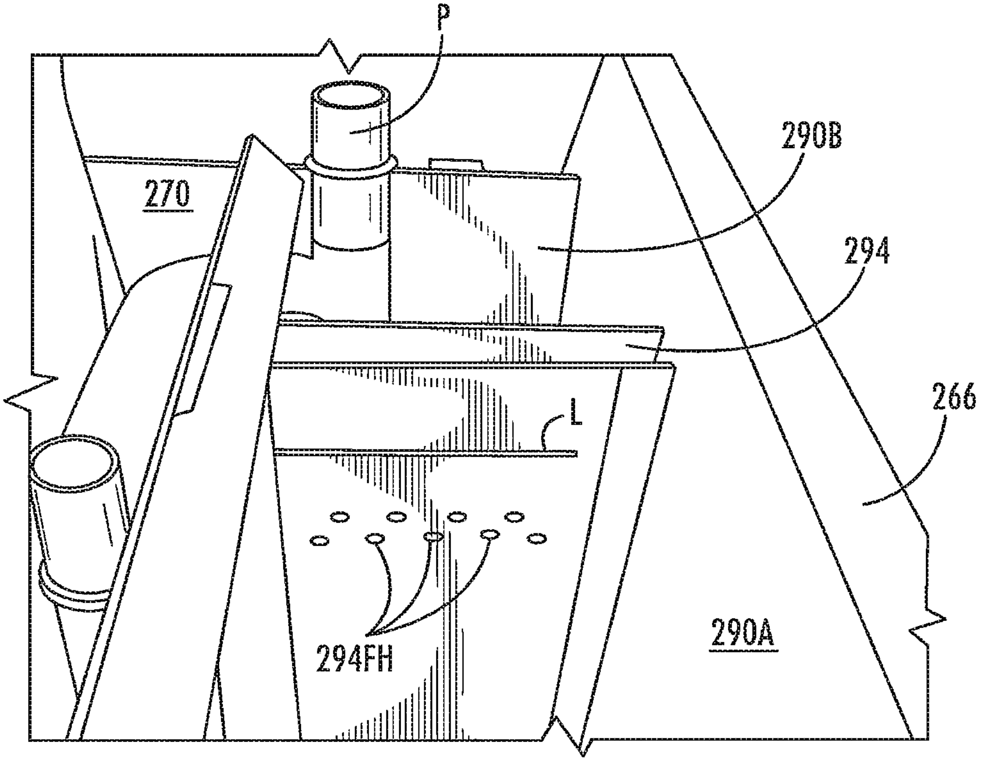
FIG. 7C is a top left side perspective focusing on the flow distribution holes (and their preferred location) in one of the partitions making up the ABR chamber of FIGS. 7A and B.

FIGS. 7A through C provide details for one set of ABR chamber innovative components. They illustrating how flow first goes down and under a first baffle, then up and over and down into the second baffle and then finally up and out of the ABR chamber via an effluent pipe that directs flow into the aeration chamber.

FIG. 7C shows the strategic placement of flow distribution holes below the water line. This serves to ensure that any floating suspended solids material is kept within the ABR chamber and does not flow into the aeration chamber. This approach serves to eliminate the need for a mechanical baffle wall across the top of the ABR chamber to keep solids back.

While the flow distribution baffles in these FIGS. depict an angle at the bottom, a straight vertical wall section could also be used. Additionally, while only two baffle arrangements are illustrated, one to multiple baffles could also be used.

The influent line to the ABR chamber can enter either side of the tank configuration or through the top as well depending on site-specific conditions.

The ABR Chamber configuration design is also such that it can accommodate the addition of chemicals or solid phase material for the purpose of addressing reduction of specific chemicals. For example, one could add alum for the intent of additional phosphorus removal. Here, alum could be added to the influent or any part of the baffled ABR chamber depending on site-specific wastewater characteristics and/or treatment requirements. Once added, then resulting precipitated phosphorus would settle out in one of the baffled chambers. Also, a buffer could be added for pH control as well. Instead of liquid chemical addition, one could also add solid phase material such as aluminum fines or iron filings for phosphorus removal as well, or any other type media aimed at phosphorus reduction. Lastly, a sulfide solution could be added for specific reduction of metals from the wastewater.

C. Aeration Chamber

The intent of the aeration chamber is to polish organic carbon to low levels and to convert ammonia nitrogen to nitrite and nitrate nitrogen. The NitROE® tank is designed with the flexibility such that this can be accomplished. Therein, wastewater after exiting the ABR chamber flows in with lateral flow across the chamber discharging through the baffled wall with holes into the next adjacent chamber, Trough A.

The aeration chamber contains multiple aeration channels with associated vertical piping for the purpose of changing out aeration tubing without removing the top as such access is provided via the access ports already shown.

The aeration chamber can have varying amounts of bio-growth support media such as plastic bio-rings and limestone rock or some other media to supply alkalinity such as clam shells, etc.; can just have one kind of media or multiple kinds. From these FIGS., one can visualize how aeration tubing is utilized and replaced as needed. The aeration chamber is filled on the bottom with some combination of bio-rings and limestone rock to protect the diffuser tube and allow for change-out as needed. Here, four channels are shown, but more or less could be used as well.

Also, each channel will have multiple holes drilled along the bottom on both sides to allow for displacement of solids so they do not accumulate in the channel.

The placement and whether or not a particular aeration channel has air supplied to it or not will vary by application. This arrangement allows for there to be anoxic zones within the channels of the aeration chamber thus serving to achieve nitrification and de-nitrification within the aeration chamber. This will serve to lower the nitrogen loading in the down-flow de-nitrification chamber thus helping to insure overall nitrogen reduction. Additionally, aeration to the aeration chamber could be done on a timed intermittent airflow basis to achieve the same result.

Figure 11:
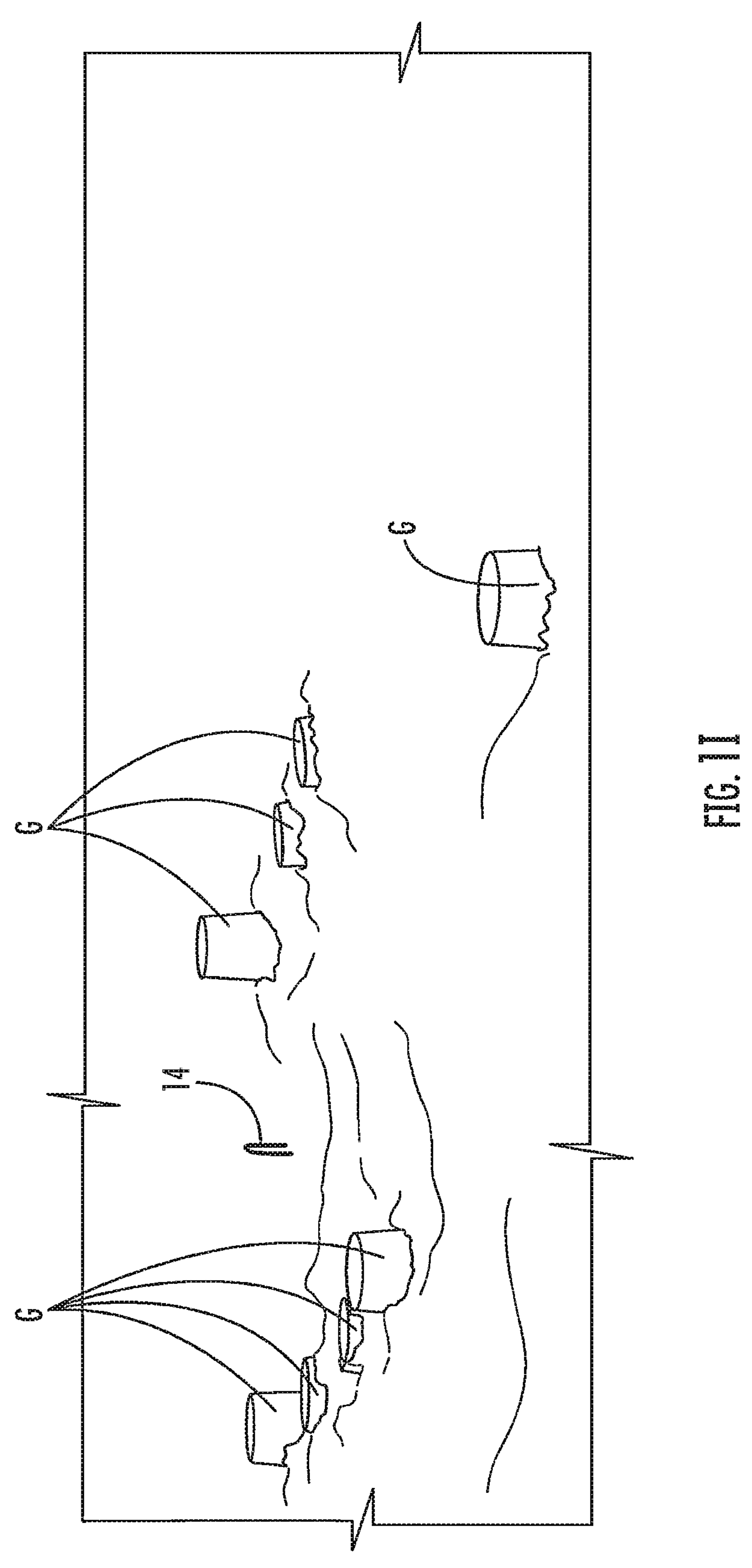

Regarding change-out of the tubing, there will be piping on both sides of each channel end. Here the tubing and diffuser will be connected to a strong line (like nylon) that will pass through the piping at each end of the channel. Thus, by pulling the line at the appropriate end, one will be able to both pull an old diffuser out for replacement, and then pull from the other end to have a new diffuser inserted into the channel. Also, the access ports on top of the tank will allow for this to be done without removing the tank as the ports and the tubing piping will be aligned. For this arrangement, it is illustrated in FIG. 11 that the pipe with only the strong line through it can be smaller than the pipe feeding the air tubing and diffuser. However, this need not be the case as different sizes of piping for the air tubing can be utilized.

In addition to this method of tubing and diffuser change-out, a pulley-type system could also be employed. Here, you only have one access pipe where instead of the strong line connected to the diffuser tubing goes out and up through a pipe at the other end of the channel, the line wraps around a pulley arrangement at the end of the channel so one can pull in both directions from a single pipe.

All aeration tubing may be connected to an air pump that will be attached to the assembly. Thus with this approach, an individual line will be able to be changed out without have to shut down aeration to the NitROE® tank.

D. Troughs A, B, and C

For Troughs A, B, and C, lateral flow there through starts by first passing through the perforated holes in the baffled wall. Troughs A, B, and C will be open channels with the exception that they may contain some floating bio-rings with solid buffering agent (e.g., small size limestone rock or sea shells, etc.) and/or liquid buffering chemicals also added. They may also have aeration supplied via a weighted air diffuser hose that will be connected to the same air pump as the air tubing to the aeration chamber. Such aeration options serve to add flexibility to the NitROE® tank as may be needed depending on site-specific conditions for the conversion of ammonia to nitrite and nitrate, along with helping to insure reducing residual organics to low levels.

In addition to the capability to supply aeration as appropriate, Troughs A and B can also be supplied with either a solid phase or liquid organic to help enhance de-nitrification; i.e., the biological conversion of nitrate to nitrogen gas in the event that the wood chips in the de-nitrification chamber need some supplemental organics based on site specific conditions.

Trough C is available to reduce organics to permit levels due to levels be elevated due to organics from the wood chips in the de-nitrification chamber. If needed, limestone chips, or liquid buffering solution, could also be added for pH control as well.

E. Final NitROE® Concept Thoughts

Based on the arrangements of the different chambers as well as some flexibility for aeration and de-nitrification enhancement as may be needed, the top access ports are strategically located for tank access without removing and having to go into the tank. In this regard, the only piece of mechanical equipment is an air pump that will be external of the NitROE® tank with tubing access via the top ports and the associated piping and channels. Also, for wood chip replacement and/or sludge removal from the ABR chamber, this will be available via the two larger access ports.

Preferably, the structural concept of having the flat sheeting on the side containing the limestone and the wood chips with black 2×4 elements on the opposite side to ensure that pressure is against the black 2×4 elements from the white flat surface.

Finally, in addition to the NitROE® Tank concept cited, the NitROE® Tank could have some combination of trough size chambers prearranged to flow from an ABR chamber, then through three or more “pairs” of aerated trough-wood chip combinations before a final aerated chamber immediately prior to exiting the supplemental tank of the system. In such an arrangement, flow would be horizontal with a baffle between the wood chips for de-nitrification and the aerated troughs. With the latter concept, there would be no need for aeration channels per se as the aerated troughs would use a weighted aeration diffuser instead. Floating bio-rings and limestone chips could be added as needed for pH control, or some liquid buffering chemical.

There are numerous other distinct concepts of septic tank based improvements still disclosed but not claimed herein. They include but are not limited to:

1. positioning an anaerobic baffled reactor (or ABR) chamber toward the front (or inlet) end of the tank, said chamber including a plurality of hockey stick-shaped flow directors;
2. providing a means for replacing aeration diffuser tubing, either via a pulley driven means or a pull-push system;
3. using a plurality of floating or non-floating bio-rings in one or more troughs of the tank;
4. using these troughs to add solid or liquid buffering material for pH control and/or adding solid and/or liquid organics for supplemental addition to aid in de-nitrification;
5. adding means for effecting residual organic carbon removal from one or more troughs toward the outlet end of this tank, on an as-needed basis or as driven by jurisdictional limitations;
6. providing an internal flow by-pass across the whole tank as may be needed by internal flow distribution not operating as designed due to unforeseen circumstances;
7. providing an ability to selectively turn on-and-off certain of the sequential aeration channels, always leaving at least one of the multiple channels on but allowing for alternating and/or cumulative aerations with the turning on or off of channels 2, 3 and 4, even numbered channels, odd numbered channels, etc.;
8. arranging for the alternating of which channels (from improvement #6 above) are left on or off with a timer/date calendar variation, phone app reminder;
9. alternating the arrangement of sequential channels and/or troughs, like that shown in FIG. 14 or numerous variations thereof-includes changing the final chamber to one of several possibilities;
10. using structural recycled plastic components for one or more elements of the tank's internals;
11. providing one or more of the stud walls within the tank with a plurality of hole grid patterns for assisting with horizontal flow through the tank proper while still providing maximum media support therein;
12. arranging the intermediate tank chambers from side-to-side for optimizing lateral space constraints, especially minimalizing longitudinal flow needs there across, said arrangement including an ability to selectively turn on-and-off (possibly with a timer/date calendar variation) certain of the sequential aeration channels, always leaving at least one of the multiple channels on but allowing for alternating and/or cumulative aerations with the turning on or off of channels 2, 3 and 4, even numbered channels or odd numbered channels;
13. positioning a plurality of flow holes, especially in the ABR chamber of this tank, BELOW the surface of water flow there through;
14. providing an external aeration pump assembly that can be accessed above-ground, possibly under a lockable cover, said pump assembly including a plurality of separately connected (plumbed and powered) channel feed ports;
15. providing the aforementioned external pump assembly with a light indicator and/or sensor warning indicator;
16. providing at least some of the aeration channels with a plurality of side hole/ports for easier solids ejection therefrom, while the tank is still in operation; and
17. the layering of bio-rings to cover respective aeration channels.

Referring now the accompanying drawings, FIGS. 1A through 1K show fabricating a multiple access port septic tank top with multiple sized (both large AND small) access ports. Here it is noteworthy that the 2 larger access ports are common to many septic tanks. This invention is unique, however, in that the NitROE® tank lid supplements the two larger ports with a plurality of multiple smaller access ports that make the functioning of the NitROE® tank able to be done without tank top removal. Multiple larger holes could not be done as it would significantly compromise the integrity of the tank top structure.

Figure 1B:
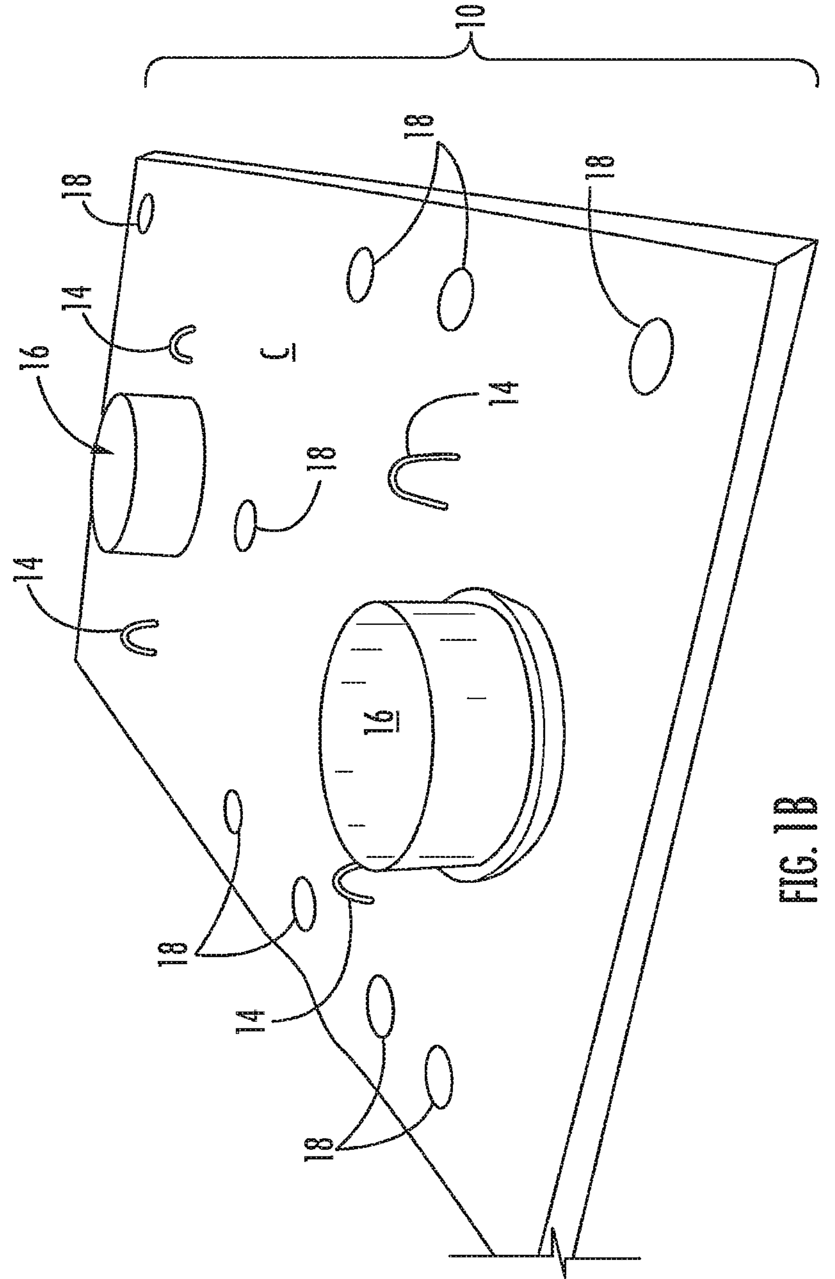
FIG. 1B is a front perspective view of the septic tank top from FIG. 1A with the concrete poured into that mold.
Figure 1C:
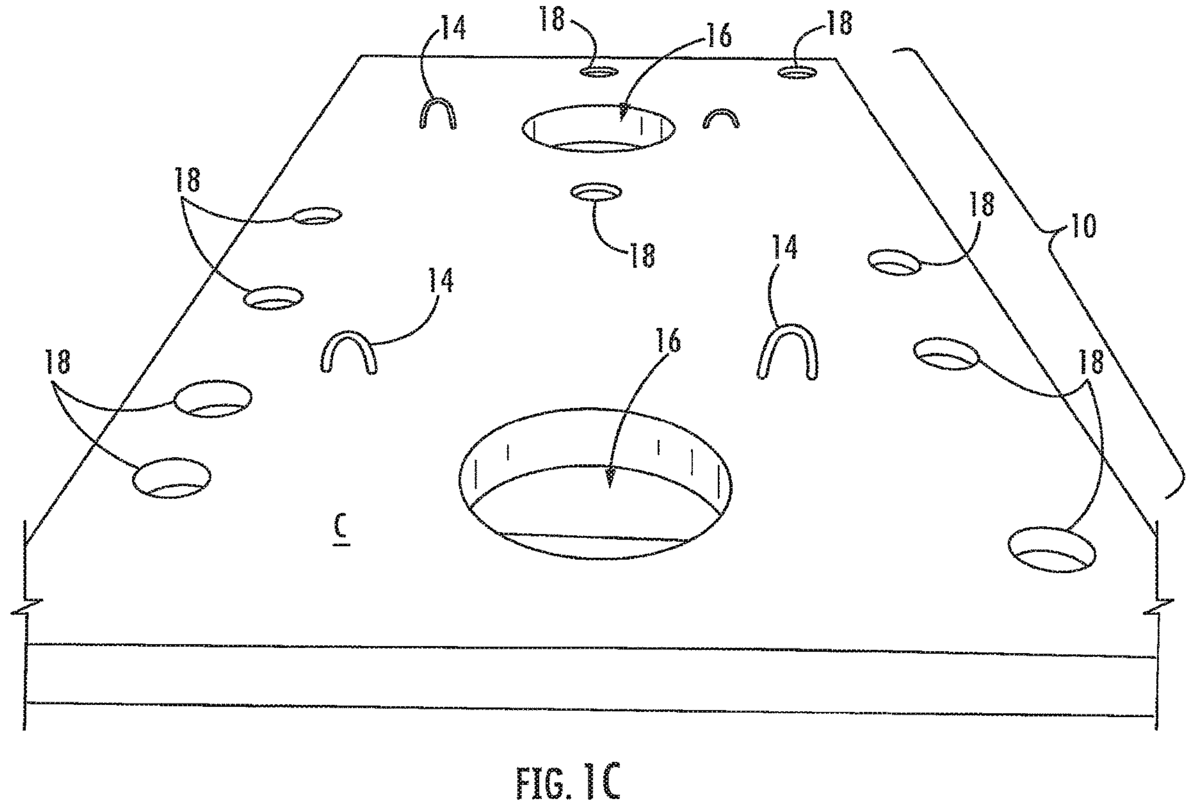
FIG. 1C is a front perspective view of the concrete septic tank top from FIGS. 1A and B removed from its pouring mold, said tank top including a plurality of lifting hooks.
Figure 1D:
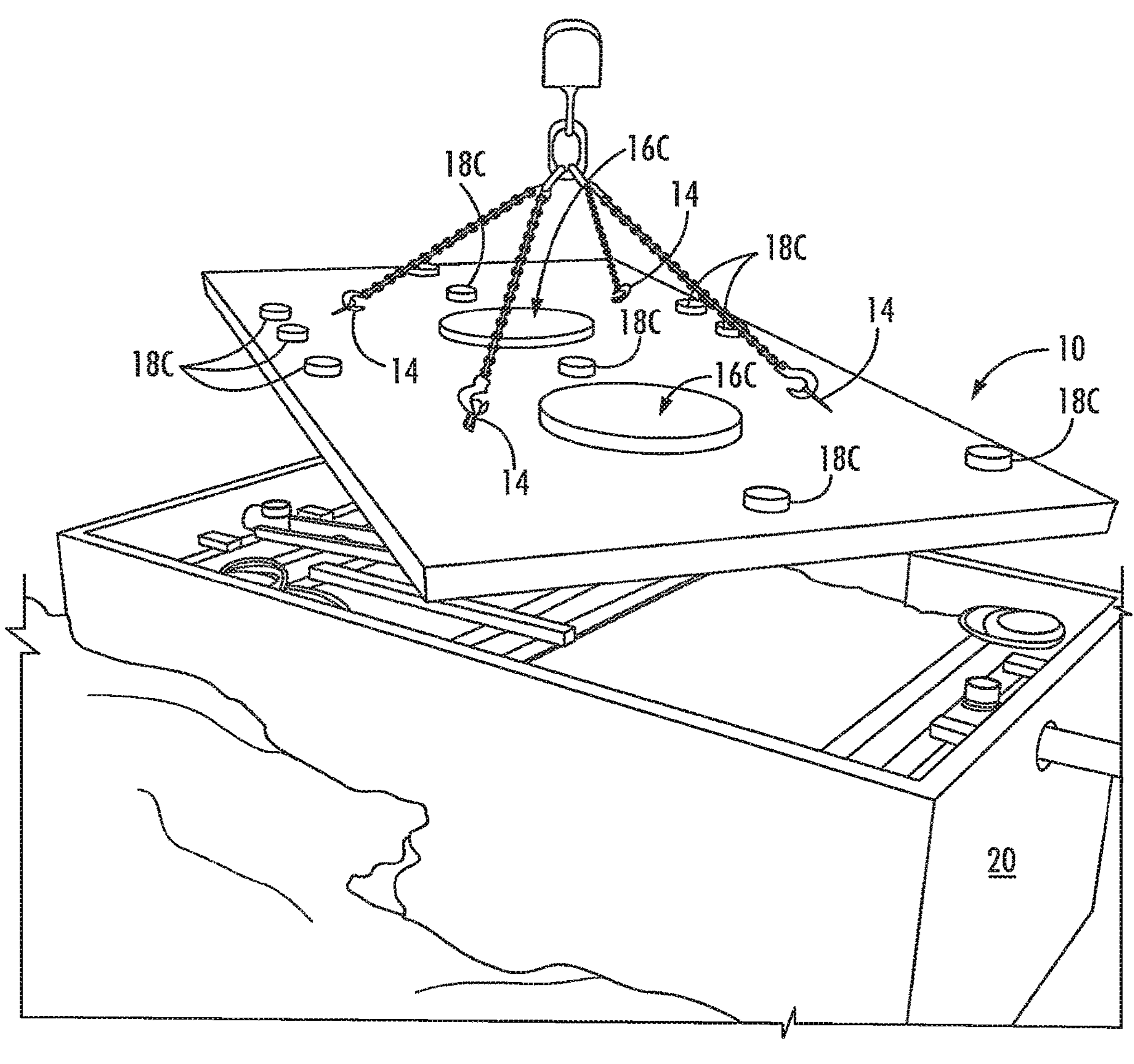
FIG. 1D is a left side perspective view showing the concrete top of FIG. 1C being placed over an installed nitrogen removal operationally efficient (or NitROE®) tank according to this invention (NitROE is a registered trademark of KleanTu L.L.C., and an assignee of this and related cases)

In FIGS. 1A through 1I, there is shown a septic tank cover/lid, generally 10. It is made by taking a rectangular concrete frame 12, with lifting hooks 14 and adding thereto circular surrounds for casting about two primary (or main) large access ports 16 and a plurality of smaller diameter access ports 18 (9 such ports are shown). In FIG. 1B, cement C has been poured into this frame 12. Once completed (i.e., sufficiently hardened), it forms a transportable hard slab concrete cover/top with 4 lifting hooks 14, 2 large access ports 16 and 9 other apertures/holes 18 for serving as the pass-through ports for smaller diameter piping. For the lifting and lowering of cover 10 in place, over an embedded, compartmentalized septic tank, generally 20, the aforementioned access ports 16 and 18 are temporarily capped or covered 16C and 18C and a crane used to move the cover about via hooks 14. See, generally, FIG. 1D.

Figure 1E:
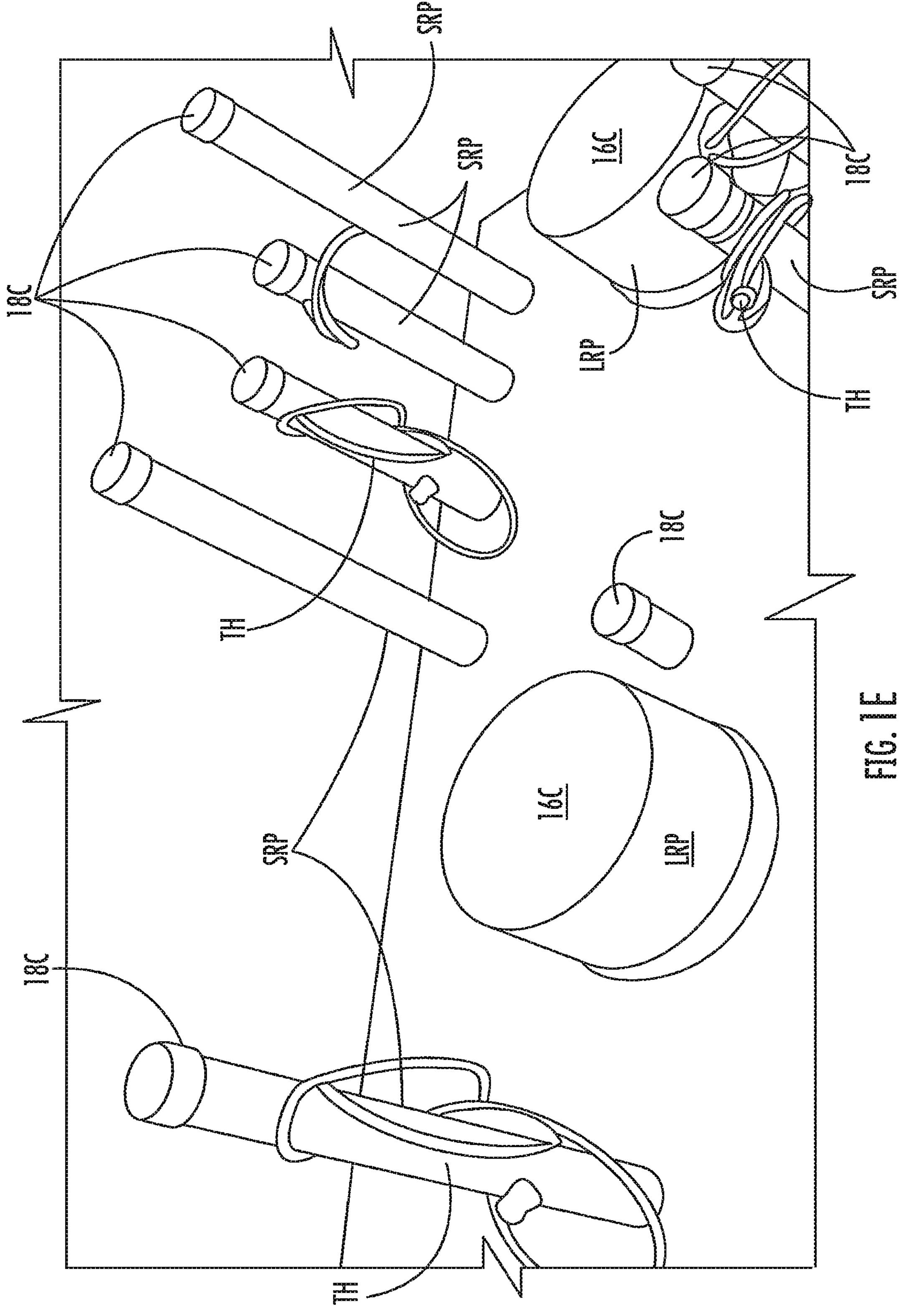
FIG. 1E is a top perspective view showing the riser pipes and caps installed through the access ports in the installed lid from FIG. 1D.
Figure 1F:
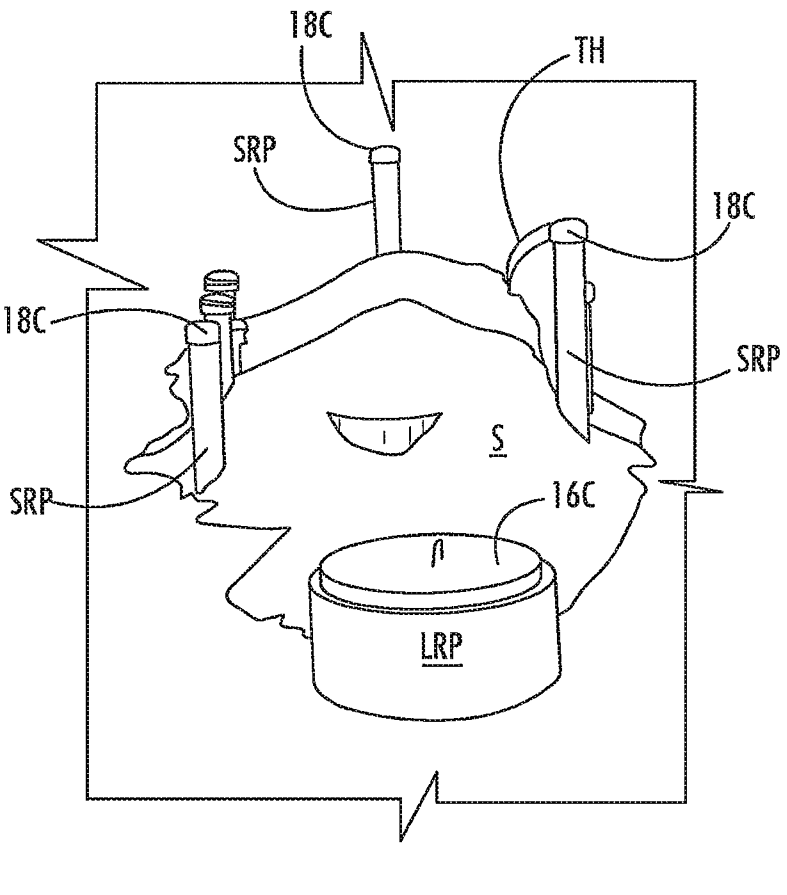
FIG. 1F is a front perspective view showing the installation of sand over the tank of FIG. 1E for bringing the system back to a soil/lawn elevation.
Figure 1G:
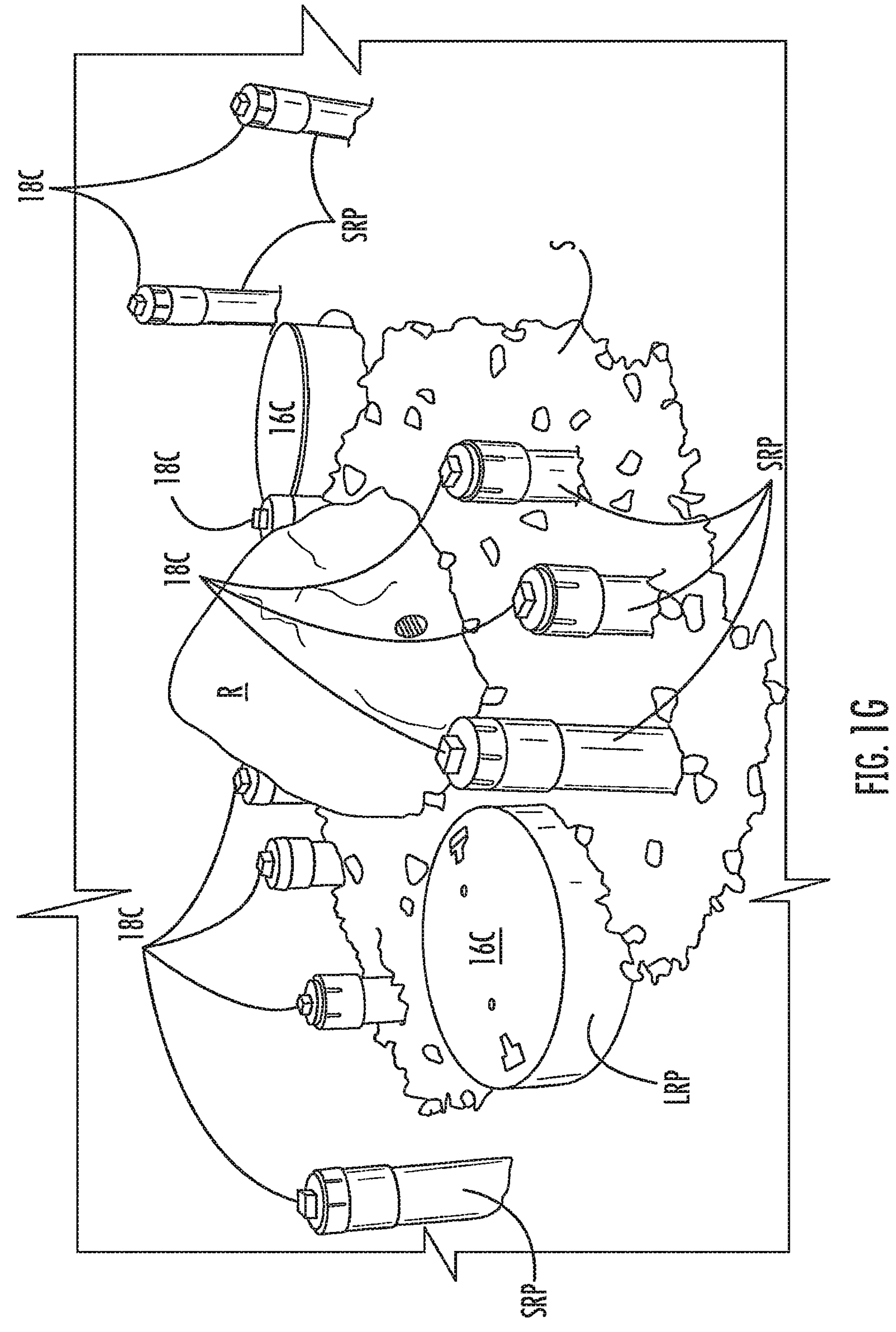
FIG. 1G is a top perspective view showing the above-ground access ports of a demonstration tank unit; it being understood that a home installation would necessarily cut most if not all of these pipes to ground level.
Figure 1H:
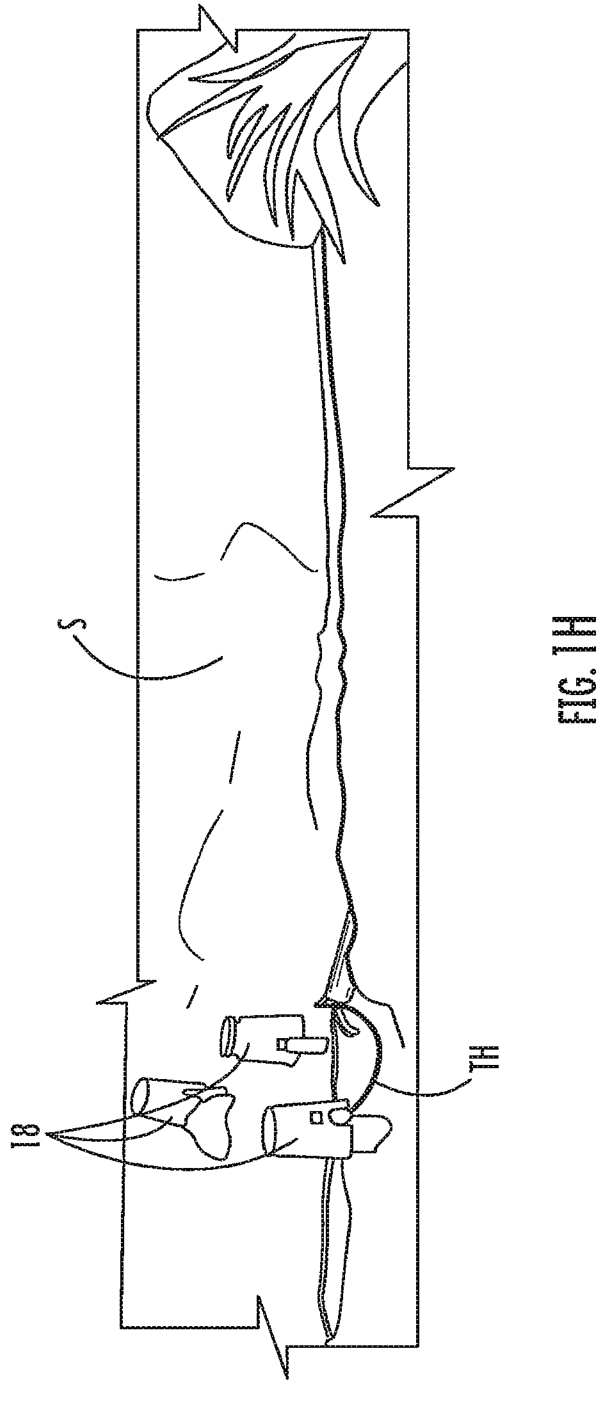
FIG. 1H is a front perspective view of a fully installed tank system with its pipes covered, at grade, so that they can eventually be mowed over.

In FIG. 1E, there is seen a plurality of riser pipes SRP installed through the smaller access ports 18 of cover 10 and two larger access port riser pipes LRP. A plurality of aeration tubes/hoses TH is shown extending from one or more of these smaller access ports 18. These riser pipes are meant to remain visible (AND fully accessible) after dirt and/or sand S covers the remainder of this fully situated cover 10 over tank 20 (as seen in the filling to surrounding ground level (FIG. 1F), marking of locations with landscaping (small and/or large rocks R) per FIG. 1G, leaving the remainder of these pipes SRP/LRP at a low enough level for mowing over (per FIG. 1H before finally covering their uppermost pipe tops with caps. Green caps G are shown in FIG. 1I for blending in with the surrounding grass that will be planted for growing over fully installed cover 10.

Figure 1J:
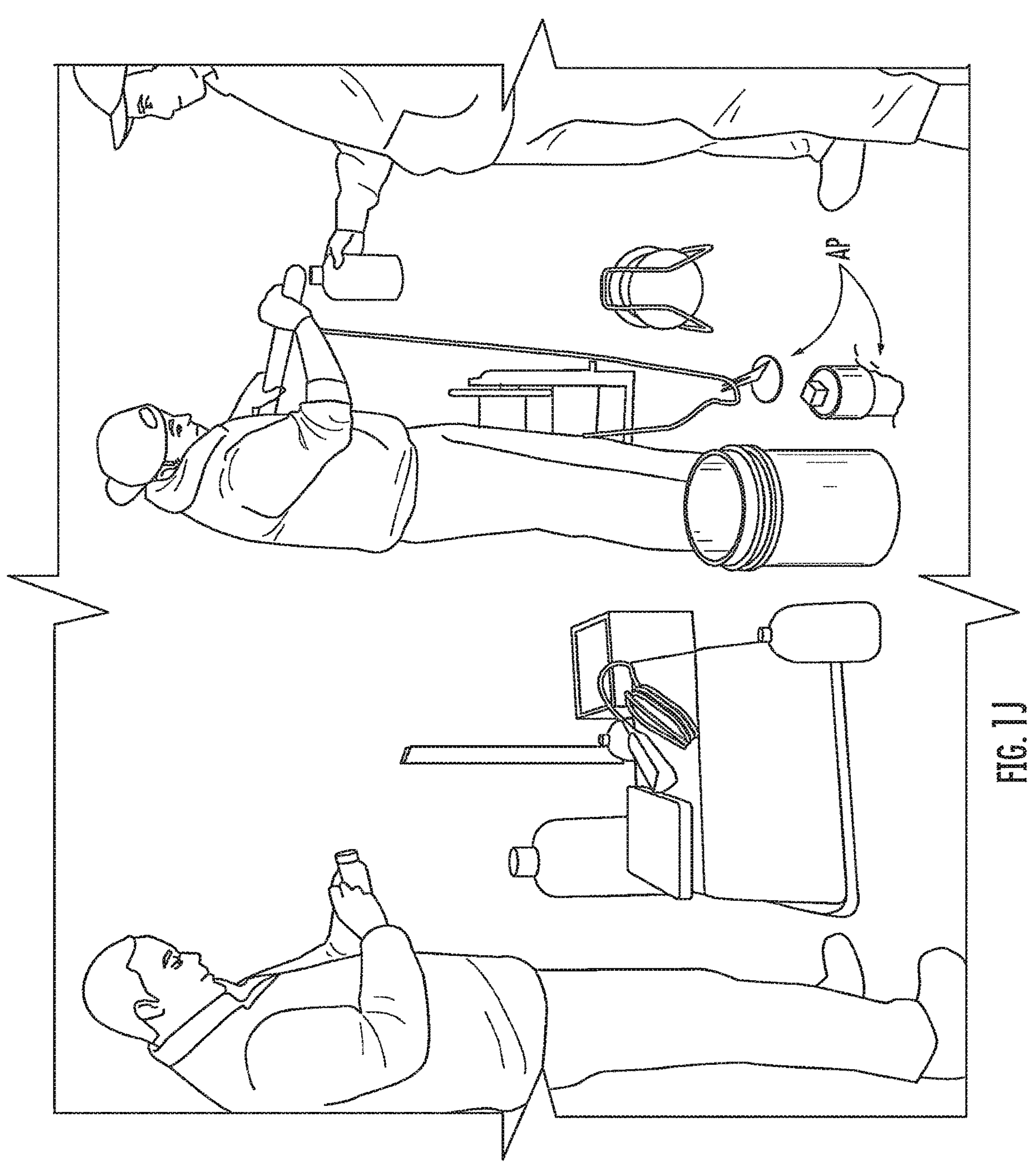
FIG. 1J is a front perspective view showing operators using the access ports of an installed system for sampling, operation and/or maintenance servicing.

FIG. 1J shows several co-inventors using these access ports/portals AP to either sample the contents of a given septic tank segment/chamber and/or use such ports for periodic O&M or (operation/maintenance) servicing.

Figure 1K:
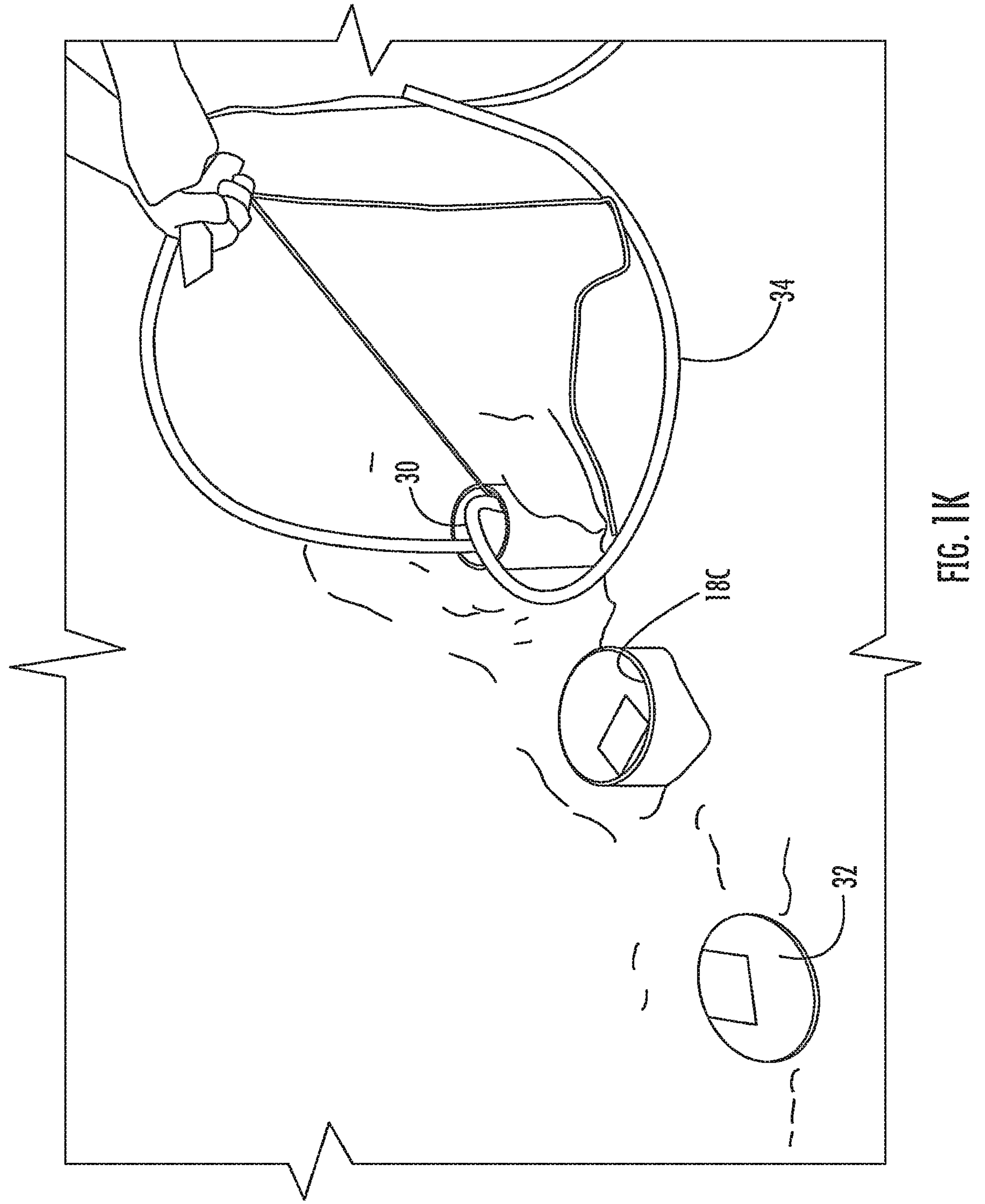
FIG. 1K is an upper perspective view showing one of the smaller access ports being used for an aeration hose change out and replacement (via push/pull) per one embodiment of this invention.
Figure 2A:
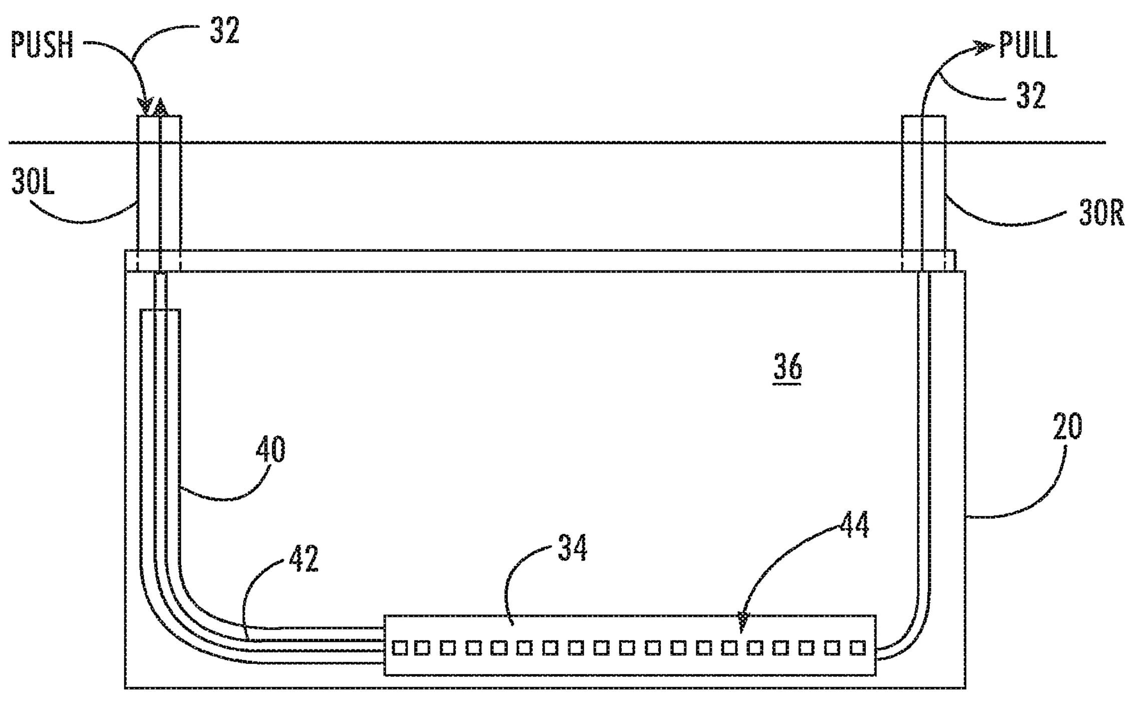
FIG. 2A is a side schematic view of an aeration tubing unit for use with the push/pull hose replacement system shown in FIG. 1K.

FIG. 1K shows one particular end-use for these cover/lid access ports. Particularly, the dirt/sand around smaller port 30 is removed and its lid set aside. Then, with a series of push-pull motions, an aeration tube 34 from inside the septic tank chamber being accessed can be changed out and replaced with another such tube, either on a periodic (timed) basis or as-needed, i.e., when testing determines that the prior aeration tubes are no longer functioning to preferred levels. FIG. 2A schematically shows (in side view) a representative push-pull tube 32 replacement exercise through ports 30L and 30R, and protective cover 34 of chamber 36 to tank 20. Note, in this particular case, the aeration tubes extend down into access area 40, about its curved coupling 42 and along-through some flexible fine bubble diffusing tube 44 before being pulled back up through an opposite service end for port 30R.

Figure 2B:
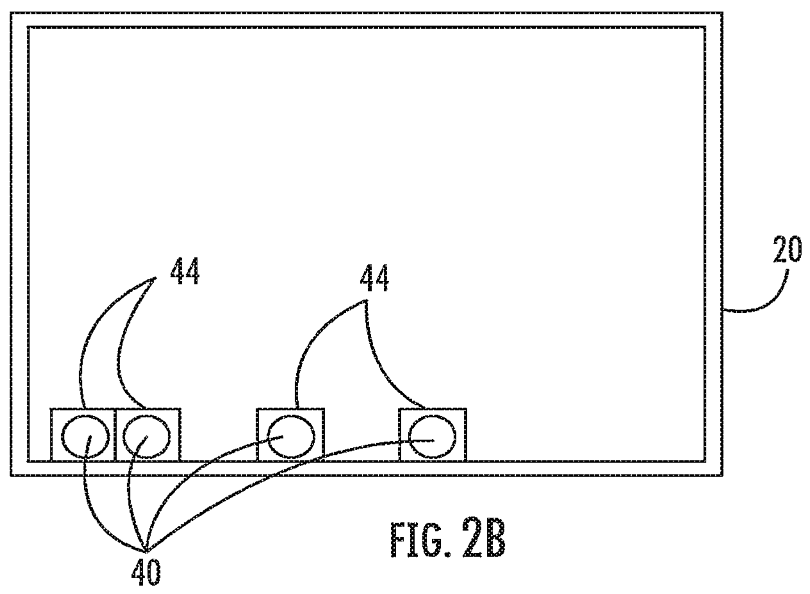
FIG. 2B is a front schematic view from one side of the septic tank showing a plurality of aeration tubing units on the tank floor.
Figure 2C:
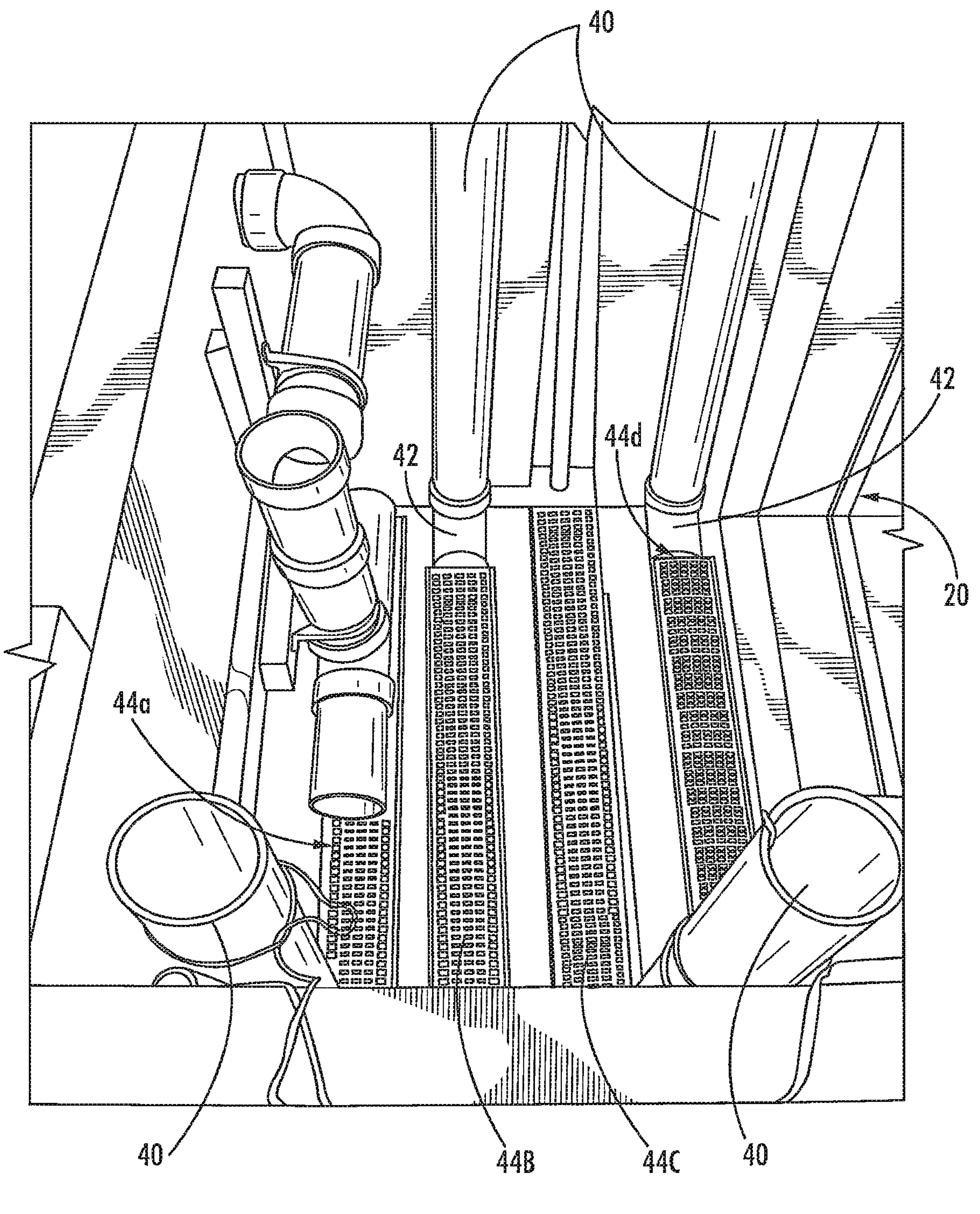
FIG. 2C is a top perspective view of the plurality of aeration tubing units from FIG. 2B.
Figure 2D:
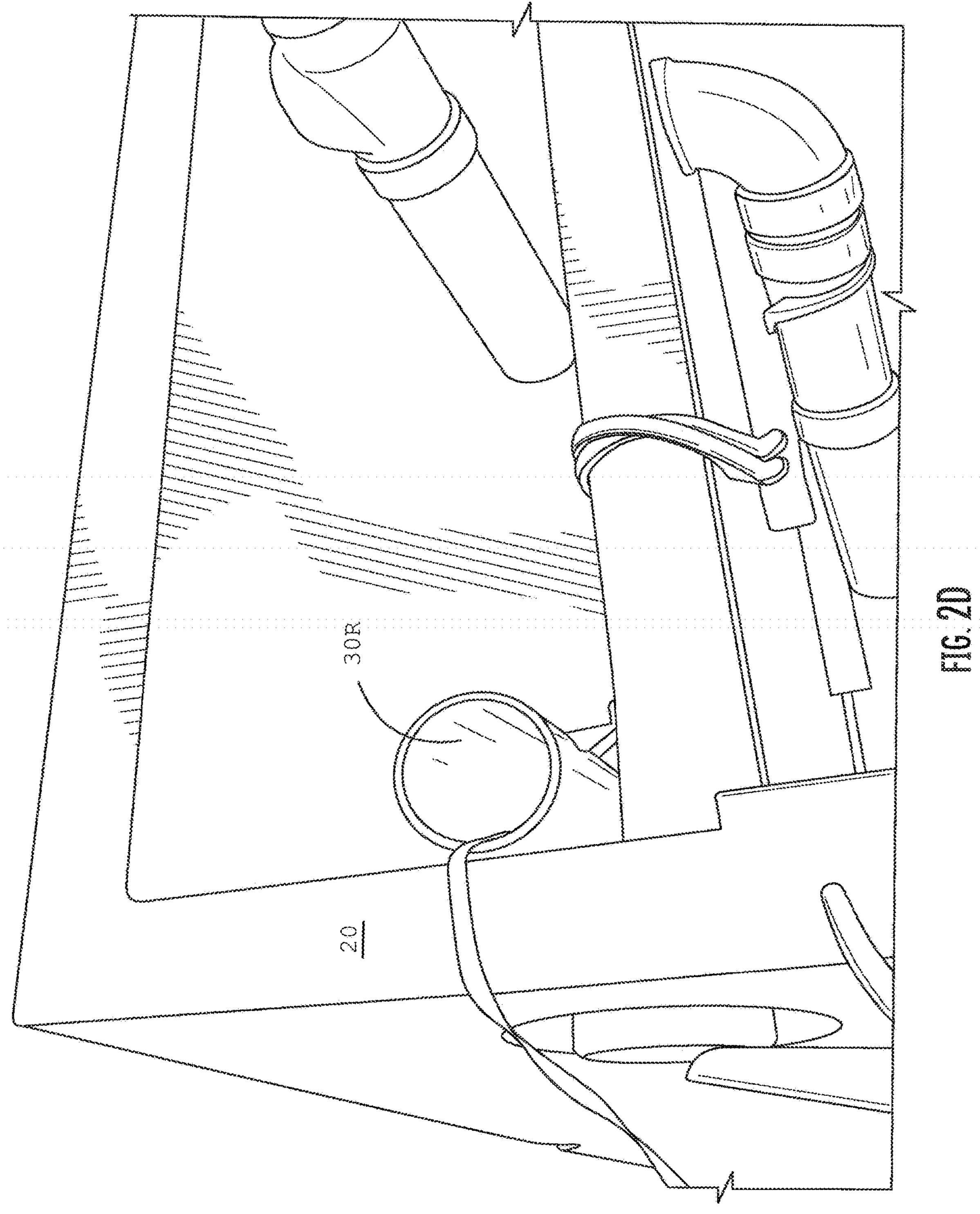
FIG. 2D is a close up perspective view of one top access pipe/port for the aeration trough/tubing units in FIGS. 2A through 2C.

One representative model of septic tank may include multiple drain channels/diffusing tubes 44*a*, 44*b*, 44*c* and 44*d* as seen schematically in FIG. 2B and from a top perspective view in FIG. 2C. The right side PULL access port 30R is seen in a top view at FIG. 2D. Note that aeration can be done within the aeration chamber, and/or in any of the adjoining troughs using the same methodology via riser pipes. The only difference is that for an aeration chamber, aeration tubing must be encased in a channel or a pipe with holes in it to protect the aeration hose from being crushed by limestone and/or other heavy media. When only floating bio-rings are present, you do not need a protective pipe or channel as there is nothing to crush the aeration hose.

Figure 3:
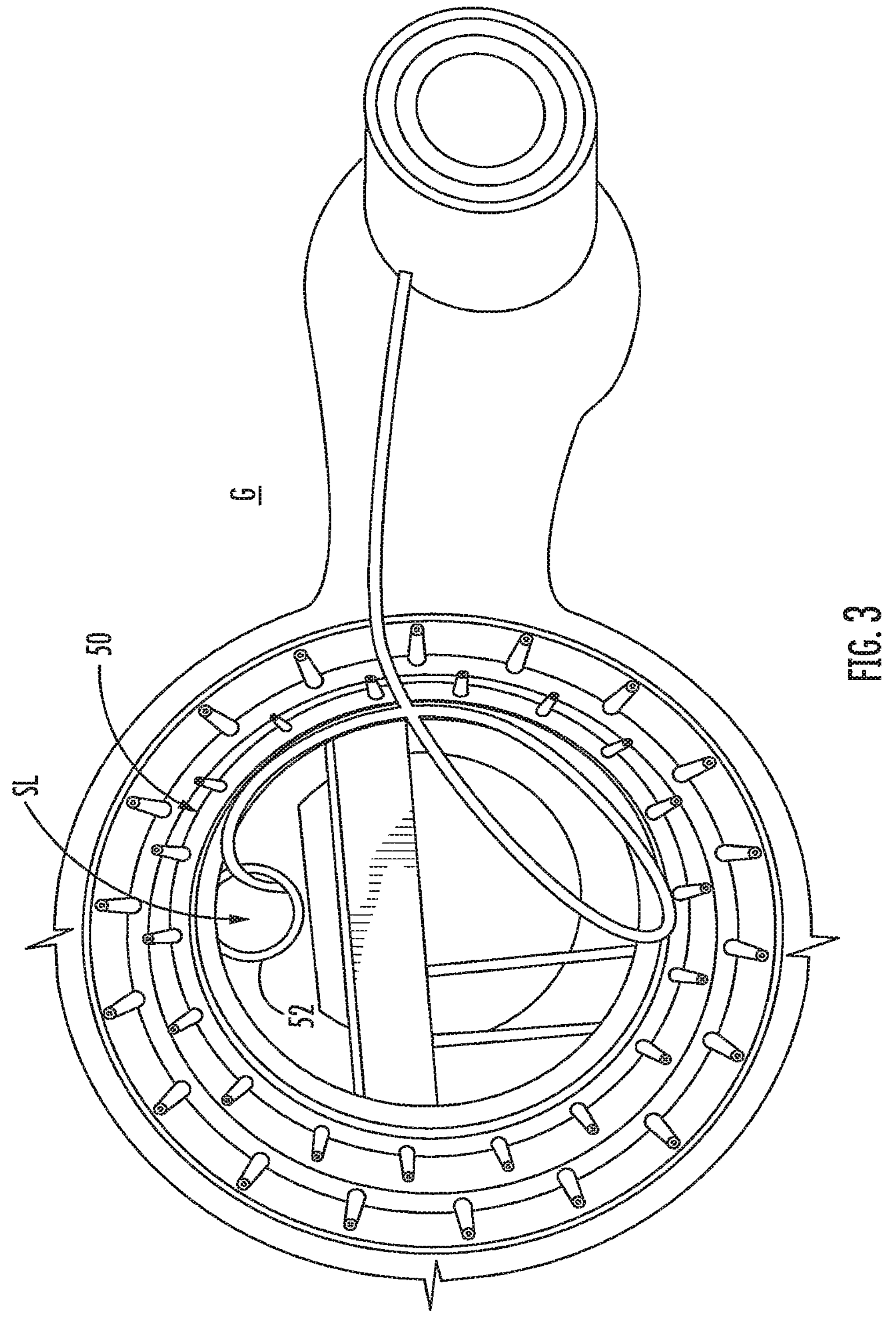
FIG. 3 is a close up top perspective view showing biological seed sludge tubing per one preferred embodiment of this invention.

FIG. 3 shows one preferred portal for use in one embodiment of this invention. Particularly, this special access tube 50 extends from ground level G and into an aeration chamber of the tank (not seen in this view). When its cover is removed, access tube 50 allows for the addition of biological seed sludge SL through its sub-chamber 52 for passing directly into its aeration chamber positioned well below ground level but still accessible for servicing through the multi-port system of this invention.

Figures 4A, 4B:
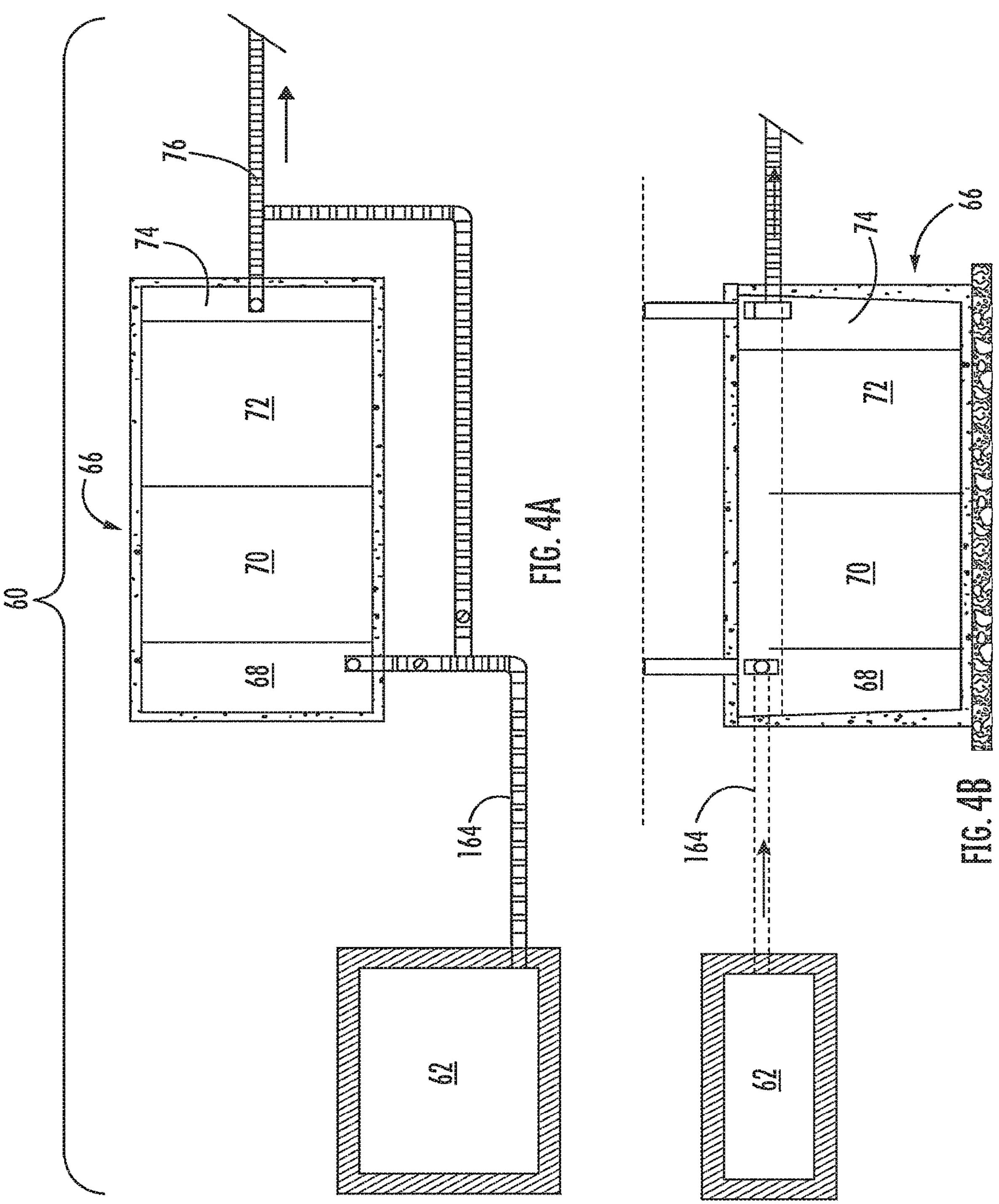
FIG. 4A is a top plan view of an improved septic tank system per this invention with its flow from the primary septic tank, to a multiple chambered intermediate/supplemental tank leading to an effluent tube exiting the system.
FIG. 4B is a side elevation view of the septic tank system shown in FIG. 4B.

FIGS. 4A and B show one representative multiple chambered septic tank system 60 for use with the cover/lids described above. Particularly, this system includes a septic tank 62 with an influent tube 64 that enters this system's preferred supplemental tank 66 that has an entry chamber 68, an aeration chamber 70, a separate de-nitrification chamber 72 and a final treatment area/outlet chamber 74 before exiting the supplemental tank 66 via effluent piping 76.

Figure 5A:
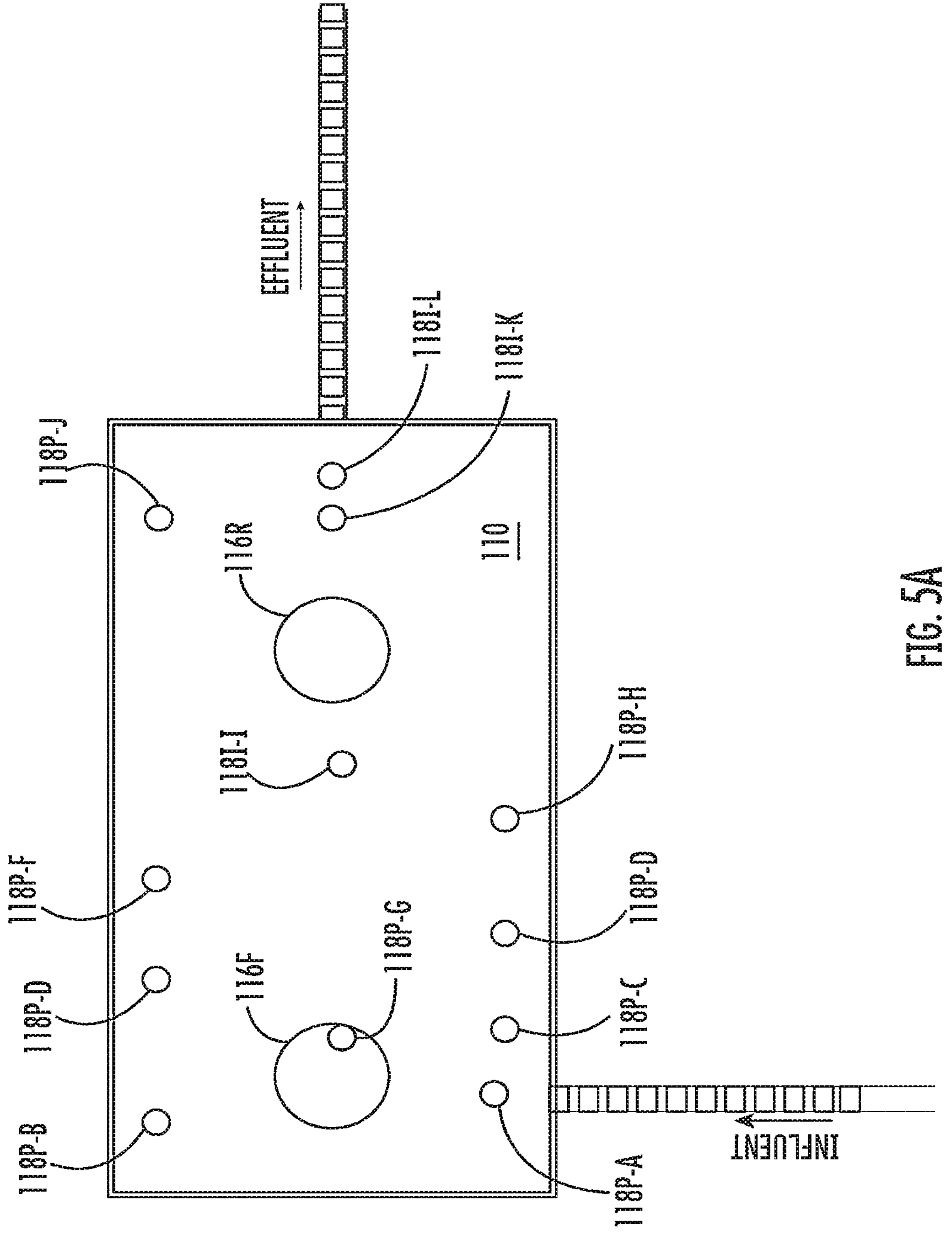
FIG. 5A is a top plan view of a supplemental tank cover/lid with multiple small and large access ports per one embodiment of this invention.

When seen in one preferred top view, a multiple segmented, supplemental tank 166 requires separate access ports for the several areas just mentioned above. Referring to one representative cover/lid 110 (in FIGS. 5A and B), there is shown a tank 120 with two large access ports 116F (for front) and 116R (for rear). Scattered about the perimeter of cover/lid 110 are a series of still other smaller access ports 118P (for perimeter ports), as well as four (as shown) intermediate, small access ports 118I.

Figure 5B:
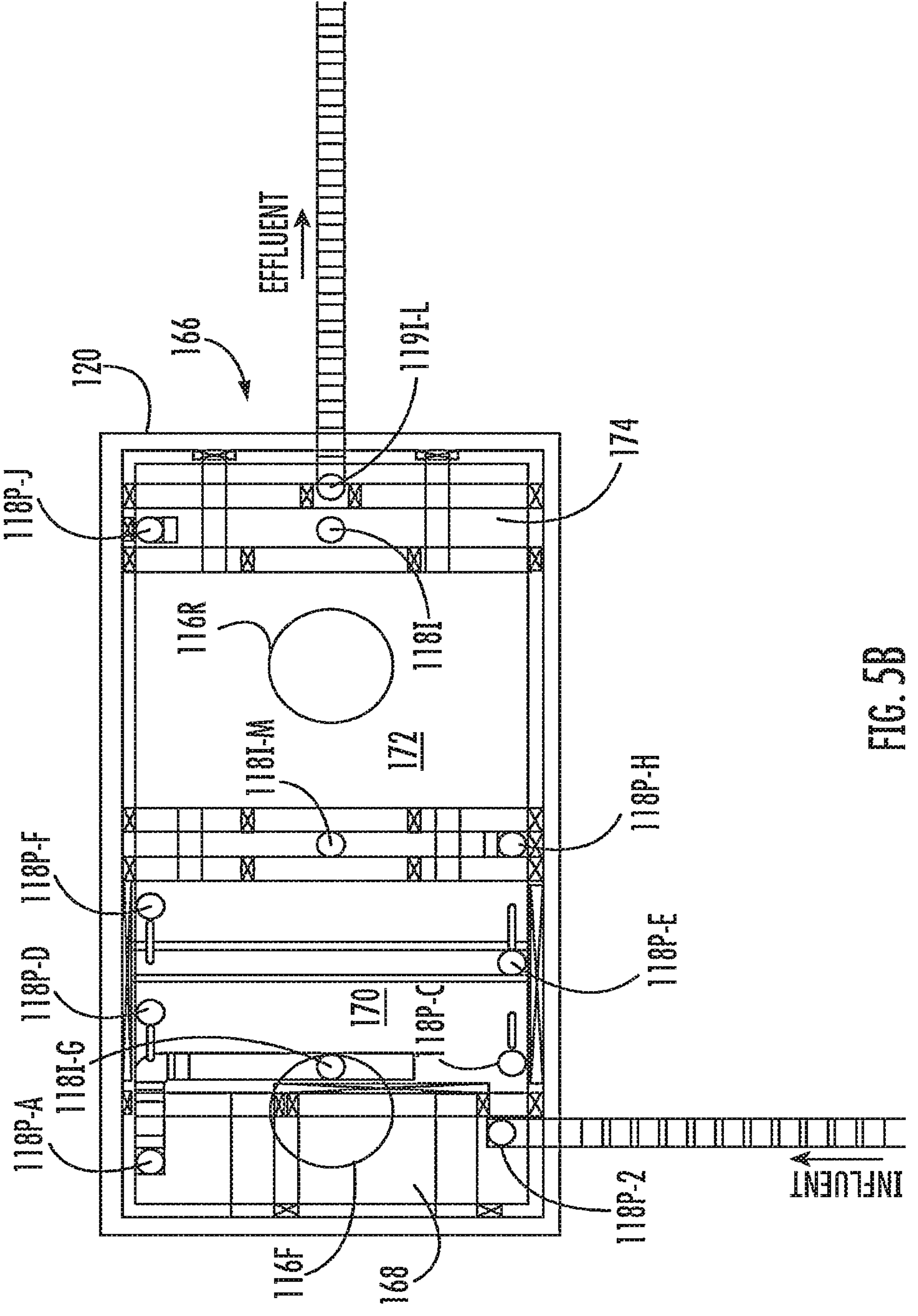
FIG. 5B is a top plan view of the various chambers to the underlying supplemental tank over which the tank cover/lid of FIG. 5A would be installed.

Particularly, as seen in the representative compartmentalization of FIG. 5B, multi-segmented tank 166 has its own entry chamber 168 with a first, lower (or left side) small service port 118P-a and a second service port 118P-b at its opposite (or right side) end. The various diffusing tubes within the aeration chamber 170 of this segmented tank 166 are served from opposed sides of this tank via small service ports 118P-c, -d, -e and -f. An additional, midway access port 118I-g can be used to reach additional internal piping concerns within tank 166.

For the next chamber in line (literally) within preferred supplemental tank 166, namely de-nitrification chamber 172, there are two small portals shown: the first along one sidewall of tank 166, or perimeter portal 118P-h and a second such portal intermediate the de-nitrification chamber 172, at portal 118I-i.

Lastly, within outlet chamber 174 of tank 166, there are provided MULTIPLE small access ports (for periodic servicing and to remove clogs should such occur and be readily detected. This includes one last perimeter portal 118P-j as well as two more intermediate portals 118I-k and -l. Note that some of these smaller pipe access portals are above the troughs for materials to be added.

Figure 6A:
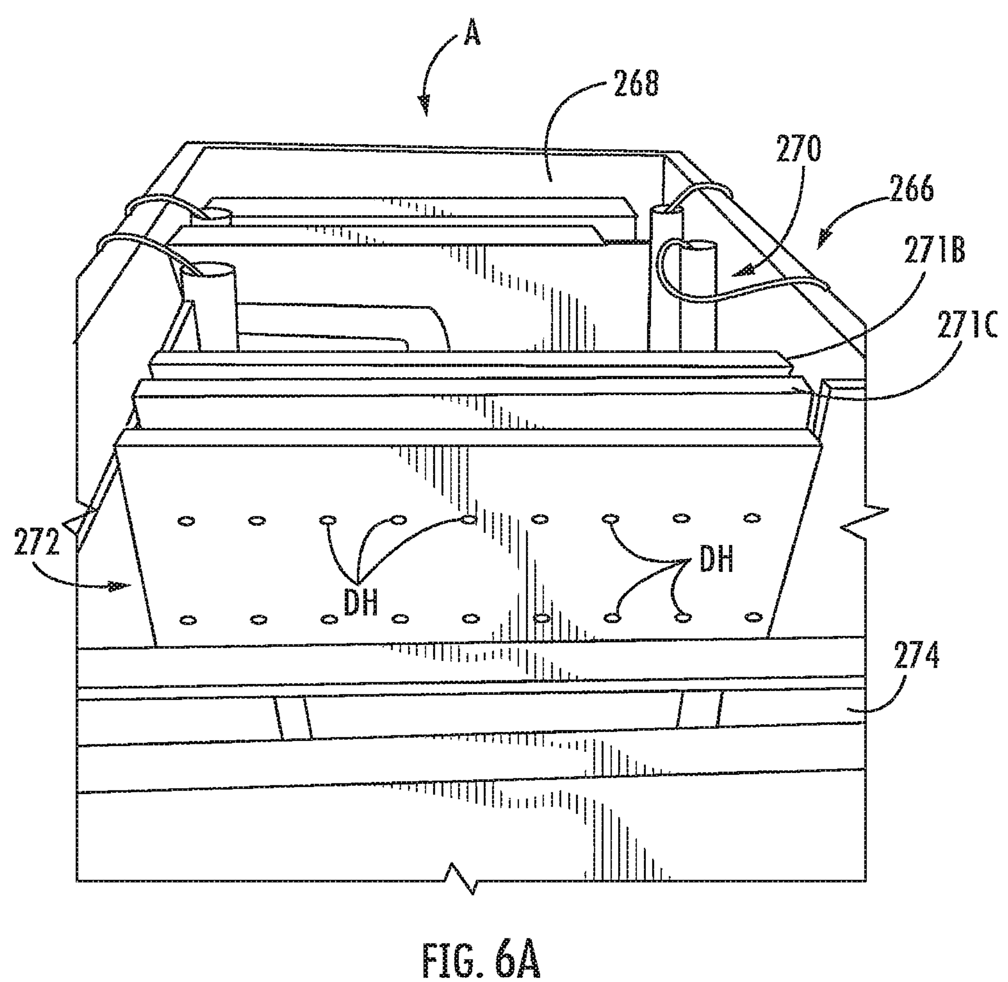
FIG. 6A is a rear perspective view of an alternative embodiment of supplemental tank with the general flow direction running from top to bottom therein.
Figure 6B:
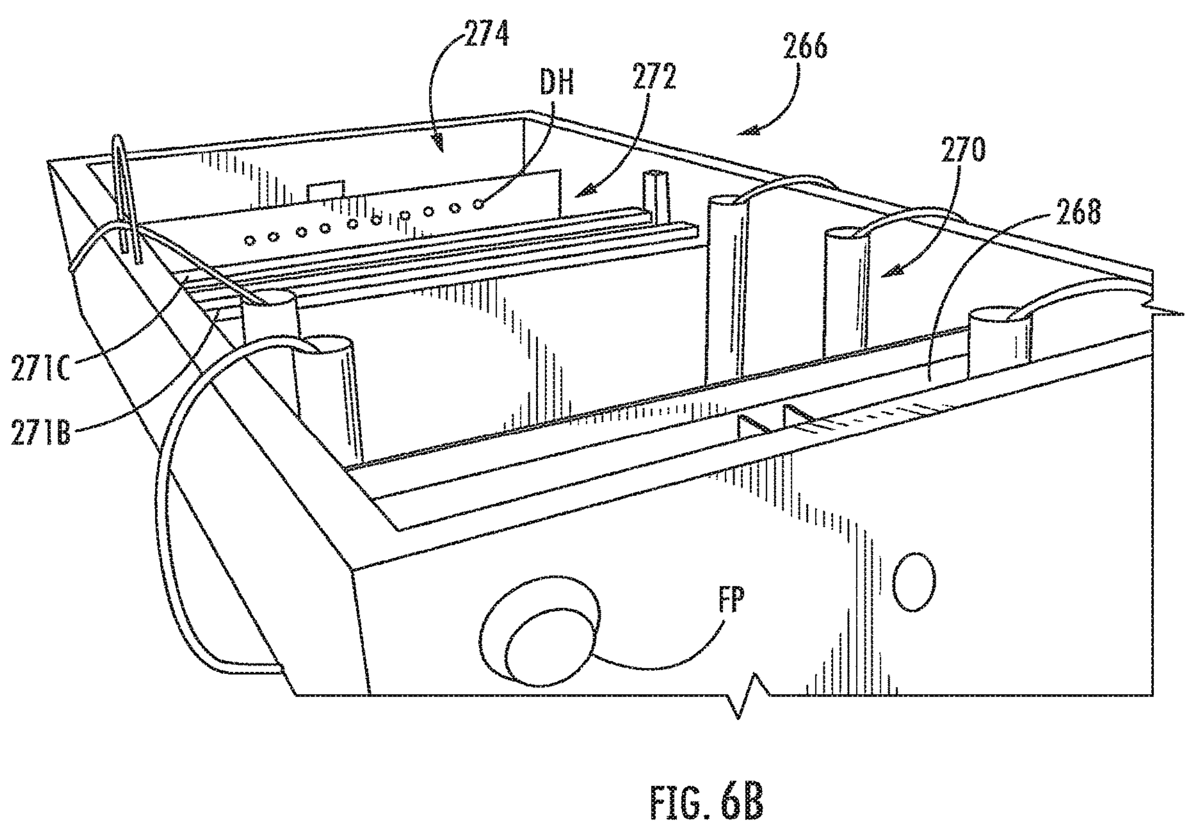
FIG. 6B is left front perspective view of the alternative supplemental tank from FIG. 6A taken from the opposite end as shown in FIG. 6A (before installation into the ground)

Referring now to FIGS. 6A and B, there is shown another representative compartmentalized supplemental (NitROE) tank 266 per this invention. Effluent flow through that tank 266 starts from top to bottom, as shown, or in the direction of the arrow A. In other words, sewage for treatment (i.e., from the primary septic tank itself), enters this supplemental tank 266, through front access portal FP, then passes into the various side-by-side compartments of ABR (or entry) chamber 268. Through appropriate access piping AP, we next pass into aeration chamber 270. In this particular variation, material then flows through a plurality of intermediate troughs, Trough A 271A and Trough B 271B before entering its de-nitrification chamber 272 with its plurality of distribution holes DH to pass through before entering the final chamber Trough C or 274 of tank 266. As depicted in FIG. 6B, one component to de-nitrification chamber 272 would include a plurality of wood chips, that can be supplemented from above—as needed—through its assigned cover/lid portal (not seen in this view).

FIGS. 7A through C show one method of assembling an ABR chamber 268 for supplemental tank 266. Particularly, at a forward most end of tank 266, with its entry portal FP, there is constructed a first axial partition/wall W, most preferably made from recycled plastic 2×4's. Axial wall W includes two or more lateral compartment 290A and 290B, each terminating at their base in a beveled bottom 292 for giving the compartments somewhat of a hockey stick shape in cross-section. Between the two lateral compartments, there is an added treatment region 294 with its plurality of flow holes 294FH which should rest below the water level (Line L) in FIG. 7C during the operation of tank 266. At the far end of ABR chamber 268, a series of piping P will then carry effluent into the next treatment section, aeration chamber 270 of this variation of tank 266.

Having described the presently preferred embodiments, and several alternative variations thereof, it is to be understood that the present invention may be otherwise embodied by the scope of the following claims.

What is claimed is:

1. A wastewater aeration system comprising:

a wastewater tank having a water input and a water output;

a first aeration encasing channel in the tank, the first encasing channel comprising a first flexible aeration tube within it, the first encasing channel having a first entrance, the first entrance sized to permit the first flexible aeration tube to pass through the first entrance, the first aeration encasing channel having an upright section and a nonupright section, the nonupright section sized to receive the first flexible aeration tube at a first end and having piping connected at a second end, the piping having an upright portion leading to an access port on a top of the wastewater tank;

a first line connected to the first flexible aeration tube and accessible through the first entrance and a second line connected to the first flexible aeration tube and accessible through the access port;

a second aeration encasing channel in the tank, the second encasing channel comprising a second flexible aeration tube within it, the second encasing channel having a second entrance, the second entrance sized to permit the second flexible aeration tube to pass through the second entrance, the second aeration encasing channel having an upright section and a nonupright section, the nonupright section sized to receive the second flexible aeration tube; and an air pump connected to deliver air to the first flexible aeration tube, wherein the first flexible aeration tube is configured to move via the first line or the second line within the upright section and the nonupright section of the first aeration encasing channel.

2. The system of claim 1 wherein the tank has multiple compartments, the compartments fluidly connected in sequence with each other, the compartments fluidly connected with one or more fluid conduits between them.

3. The system of claim 2 wherein two or more of the multiple compartments have access holes with a first port and a second port, the first port being larger than the second port.

4. The system of claim 1 wherein the tank comprises concrete, the tank comprises a top and wherein the tank is fully positioned underground.

5. The system of claim 1 wherein the first aeration encasing channel has an access port at a perimeter surface of the wastewater tank and the second aeration encasing channel has an access port at a perimeter surface of the wastewater tank.

6. A wastewater treatment system comprising:

a first settlement treatment tank, the settlement treatment tank having a first wastewater input and a first wastewater output; and a second tank, the second tank coupled to receive water from the first wastewater output, the second tank comprising a first chamber, a second aeration chamber, and a third denitrification chamber, the second aeration chamber comprising a push-pull tube, the push-pull tube comprising a curved portion and a diffusing tube, and an aeration tube positioned within the push-pull tube, the aeration tube sized for movement within the push-pull tube;

wherein the second tank further comprises a first access port, the first access port providing access to the push-pull tube and the aeration tube from outside of the second tank, wherein the second tank has a top and a second access port, the first access port and the second access port providing access to the push-pull tube and the aeration tube from outside of the second tank, and wherein a first cord is coupled to the aeration tube and a second cord is coupled to the aeration tube, the first cord reachable through a first end of the push-pull tube and the second cord reachable through a second end of the push-pull tube.

7. The wastewater treatment system of claim 6, wherein the second tank comprises concrete.

8. The wastewater treatment system of claim 6 wherein water travels under gravity flow from the first chamber, to the second aeration chamber, and to the third denitrification chamber.

9. The wastewater treatment system of claim 6 wherein the first access port is above ground and the second access port is above ground.

10. The wastewater treatment system of claim 6 wherein the push-pull tube comprises a horizontal portion and an upright portion, the horizontal portion connected to the diffusing tube.

11. The wastewater treatment system of claim 6 wherein the diffusing tube is positioned in a section of the push-pull tube.

12. The wastewater treatment system of claim 6 wherein the diffusing tube is fluidly connected to the aeration tube.

13. A wastewater aeration system comprising:

a wastewater tank having a water input and a water output;

a first aeration encasing channel in the tank, the first encasing channel comprising a first flexible aeration tube within it, the first encasing channel having a first entrance, the first entrance sized to permit the first flexible aeration tube to pass through the first entrance, the first aeration encasing channel having an upright section and a nonupright section, the nonupright section sized to receive the first flexible aeration tube;

a line coupled to the first flexible aeration tube; and an air pump connected to deliver air to the first flexible aeration tube, wherein the first flexible aeration tube is configured to move within the upright section and the nonupright section of the first aeration encasing channel, and wherein the first aeration encasing channel comprises a diffusing tube.

14. The wastewater aeration system of claim 13 wherein the wastewater tank has an internal bottom surface and wherein the first flexible aeration tube is positioned along the internal bottom surface.

15. The wastewater aeration system of claim 13 wherein the first flexible aeration tube has a distal end with an exit opening.

16. The wastewater aeration system of claim 13, wherein the line is positioned at least partially within the first aeration casing.

17. The wastewater aeration system of claim 13 wherein the first aeration encasing channel is within an aeration chamber and wherein the aeration chamber is in fluid communication with a dentification chamber.

* * * * *